US008803856B2

(12) United States Patent
Yamazaki

(10) Patent No.: US 8,803,856 B2
(45) Date of Patent: Aug. 12, 2014

(54) ELECTRIC OPTICAL APPARATUS, DRIVING METHOD THEREOF AND ELECTRONIC DEVICE

(75) Inventor: Katsunori Yamazaki, Matsumoto (JP)

(73) Assignee: Seiko Epson Corporation (JP)

( * ) Notice: Subject to any disclaimer, the term of this patent is extended or adjusted under 35 U.S.C. 154(b) by 317 days.

(21) Appl. No.: 12/986,501

(22) Filed: Jan. 7, 2011

(65) Prior Publication Data

US 2011/0169805 A1 Jul. 14, 2011

(30) Foreign Application Priority Data

Jan. 12, 2010 (JP) ................................. 2010-004173

(51) Int. Cl.
*G06F 3/038* (2013.01)
*G09G 5/00* (2006.01)

(52) U.S. Cl.
USPC .............................. 345/204; 345/76; 345/107

(58) Field of Classification Search
None
See application file for complete search history.

(56) References Cited

U.S. PATENT DOCUMENTS

| | | | | |
|---|---|---|---|---|
| 7,408,610 | B2 * | 8/2008 | Yamazaki | 349/143 |
| 7,589,699 | B2 * | 9/2009 | Miyazawa | 345/76 |
| 2001/0024186 | A1 * | 9/2001 | Kane et al. | 345/98 |
| 2002/0196211 | A1 * | 12/2002 | Yumoto | 345/76 |
| 2002/0196213 | A1 * | 12/2002 | Akimoto et al. | 345/82 |
| 2003/0137503 | A1 * | 7/2003 | Kimura et al. | 345/212 |
| 2004/0026723 | A1 * | 2/2004 | Miyazawa | 257/277 |
| 2005/0068279 | A1 | 3/2005 | Hirota et al. | |
| 2005/0083270 | A1 * | 4/2005 | Miyazawa | 345/76 |
| 2005/0094059 | A1 * | 5/2005 | Noguchi | 349/106 |
| 2005/0156168 | A1 * | 7/2005 | Miyazawa | 257/59 |
| 2005/0264498 | A1 * | 12/2005 | Asano | 345/76 |
| 2006/0232574 | A1 * | 10/2006 | Miyazawa | 345/204 |
| 2007/0211020 | A1 * | 9/2007 | Nihei et al. | 345/108 |
| 2007/0291042 | A1 * | 12/2007 | Kwak et al. | 345/535 |
| 2008/0088549 | A1 * | 4/2008 | Nathan et al. | 345/80 |
| 2008/0117132 | A1 * | 5/2008 | Kimura | 345/60 |
| 2009/0079345 | A1 * | 3/2009 | Inuiya | 313/523 |
| 2009/0167649 | A1 * | 7/2009 | Ishizuka | 345/80 |
| 2009/0303162 | A1 * | 12/2009 | Kohno et al. | 345/76 |
| 2010/0020061 | A1 * | 1/2010 | Kanauchi et al. | 345/213 |
| 2010/0149141 | A1 * | 6/2010 | Kim | 345/205 |
| 2010/0289017 | A1 * | 11/2010 | Ha et al. | 257/40 |
| 2011/0018855 | A1 | 1/2011 | Miyazawa | |
| 2011/0115758 | A1 | 5/2011 | Kimura et al. | |

FOREIGN PATENT DOCUMENTS

| | | | | | |
|---|---|---|---|---|---|
| JP | 2003-288049 | A | | 10/2003 | |
| JP | 2004-126526 | A | | 4/2004 | |
| JP | 2005-099773 | A | | 4/2005 | |
| JP | 2008-176330 | | | 7/2008 | |
| WO | PCT/JP2006/323802 | | * | 6/2007 | G09G 3/30 |

* cited by examiner

*Primary Examiner* — Amare Mengistu
*Assistant Examiner* — Antonio Xavier
(74) *Attorney, Agent, or Firm* — Harness, Dickey & Pierce, P.L.C.

(57) ABSTRACT

An electric optical apparatus including a display section in which an electric optical material is pinched between a pair of substrates and a plurality of pixels is arranged, wherein the display section is provided with a scanning line, a data line and a power-supply line that are connected to each of the pixels, and each of the pixels is provided with a pixel electrode, a driving transistor that is connected between the pixel electrode and the power-supply line, a capacitance for modulation that is connected between a gate of the driving transistor and the data line, a maintenance capacitance that connects one side electrode to the gate of the driving transistor, and a transistor for correction that is connected to a diode and in which one side terminal thereof is connected to the gate of the driving transistor.

9 Claims, 10 Drawing Sheets

ELECTRIC OPTICAL APPARATUS, DRIVING METHOD THEREOF AND ELECTRONIC DEVICE

CROSS-REFERENCE TO RELATED APPLICATION

This application is based on and claims priority from Japanese Patent Application No. 2010-004173, filed on Jan. 12, 2010, the contents of which are incorporated herein by reference.

BACKGROUND

1. Technical Field

The present invention relates to an electric optical apparatus, a driving method thereof and an electronic device.

2. Related Art

An electrophoretic display apparatus that includes a control transistor, a maintenance capacitance and a driving transistor within a pixel is known in the related art (for example, JP-A-2008-176330). In the pixel of the electrophoretic display apparatus described in JP-A-2008-176330, the maintenance capacitance is charged by an image signal that is input through the control transistor and the driving transistor flows a current to a pixel electrode according to a voltage of the maintenance capacitance. Thus, brightness display can be obtained according to an amount of charge (current×time) that is supplied to the pixel electrode.

In the pixel described in JP-A-2008-176330, the current $I_s$ that flows in the driving transistor is presented by the Equation shown below. Here, W is a channel width, L is a channel length, $C_{ox}$ is a constant that is present in an equation $\in_{ox}/t_{ox}$ ($\in_{ox}$: a dielectric constant of gate oxide film, $t_{ox}$: a thickness of a gate insulating film), μ is mobility, $V_{th}$ is a threshold value voltage, and $V_g$ and $V_s$ are a gate voltage and a source voltage respectively.

$$I_s = \frac{1}{2}\frac{W}{L}C_{ox}\mu(V_g - V_s - V_{th})^2$$

Here, $V_{th}$ of the above-described Equation has a variation in regard to each of the transistors which is caused by a variation of a position of film formation during a transistor manufacturing process. Thus, the current $I_s$ is varied in each of the pixels and display tones are different to each other so that unevenness display occurs.

SUMMARY

An advantage of some aspects of the invention is to provide an electric optical apparatus and a driving method thereof that can obtain high quality image display which decrease the unevenness display.

According to an aspect of the invention, there is provided an electric optical apparatus including a display section in which an electric optical material is pinched between a pair of substrates and a plurality of pixels is arranged, wherein the display section is provided with a scanning line, a data line and a power-supply line that are connected to each of the pixels, and each of the pixels is provided with a pixel electrode, a driving transistor that is connected between the pixel electrode and the power-supply line, a capacitance for modulation that is connected between a gate of the driving transistor and the data line, a maintenance capacitance that connects one side electrode to the gate of the driving transistor, and a transistor for correction that is connected to a diode and in which one side terminal thereof is connected to the gate of the driving transistor.

According to the aspect of the invention, the gate potential of the driving transistor can be corrected using the characteristic in which OFF state is present when the driving transistor and the transistor for correction are provided within the same pixel, and the voltage of one side terminal of the transistor for correction that is connected to the diode becomes lower than or equal to the threshold value voltage. Specifically, when the maintenance capacitance is charged with a voltage more than or equal to the threshold value voltage of the transistor for correction, the transistor for correction that is connected to the diode becomes ON state so that a portion of the accumulated charge of the maintenance capacitance is drawn out until the voltage of the one side terminal becomes the threshold value voltage. In this state, the gate voltage of the driving transistor becomes the same as the threshold value voltage of the transistor for correction. Since the driving transistor and the transistor for correction are formed within the same pixel, the threshold value voltages of both are substantially the same. Thus, the state where the threshold value voltage of the driving transistor is corrected can be obtained by the operation of the transistor for correction.

Accordingly, if the image signal is input through the capacitance for modulation in the state that the threshold value voltage is corrected, the tone display can be obtained according to the image signal without an influence of the variation of the threshold value voltage. According to the invention, the electric optical apparatus that can obtain high quality image display which decrease the unevenness display can be provided.

It is preferable that the electric optical apparatus have a control transistor that is connected between the capacitance for modulation and the data line.

According to the invention, since the image signal is input to the capacitance for modulation through the control transistor, the electrode potential of the capacitance for modulation can be avoid to be changed when the image signal is input to other pixel and the image display can be performed with a brief driving method.

It is preferable that the electric optical apparatus have a potential control line that is connected to the other side terminal of the transistor for correction.

According to the invention, the potential of the other side terminal of the transistor for correction can be controlled through the potential control line and the transistor for correction can be forcedly maintained in an OFF state. Accordingly, when the electrode potential of the capacitance for modulation is changed at the time which the image signal is input to another pixel, the transistor for correction can be prevented from being in an ON state and the input image signal can be maintained satisfactorily.

It is preferable that the electric optical apparatus have a potential control line that is connected to the other side electrode of the maintenance capacitance.

According to the invention, the electrode potential of the maintenance capacitance can be controlled through the potential control line and the gate potential of the driving transistor can be forcedly maintained at a low potential. Accordingly, when the electrode potential of the capacitance for modulation is changed at the time that the image signal is input to another pixel, the driving transistor can be prevented from being in an ON state.

It is preferable that the electric optical apparatus have a switching element for precharge that connects an output terminal to the gate of the driving transistor and the capacitance for modulation.

According to the invention, the maintenance capacitance can be charged at a desired timing.

It is preferable that other scanning line different from the scanning line to which the pixel is belonged is connected to an input terminal of the switching element for precharge.

According to the invention, the maintenance capacitance can be charged when the scanning line of another row is selected and the correction of the threshold value voltage can be effectively performed.

It is preferable that the electric optical apparatus have a power-supply line for precharge that is connected to the input terminal of the switching element for precharge.

According to the invention, the precharge operation can be further flexibly performed without depending on the selection signal of the scanning line of the charge amount that is precharged to the maintenance capacitance.

It is preferable that the electric optical apparatus have a potential control section that is connected to the potential control line, and a first control line and a second control line that are connected to the potential control section, wherein the potential control section has a first switch circuit that is inserted between the first control line and the potential control line and a second switch circuit that is inserted between the second control line and the potential control line, the first switch circuit becomes ON state during a period that a selection signal is input to the scanning line to which the potential control line is belonged, and the second switch circuit becomes ON state during a period that the selection signal is input to the other scanning line different from the scanning line.

According to the invention, since the desired potential can be input to the potential control line synchronized with the selection operation of the scanning line, the electric optical apparatus can be effectively perform the correction operation of the threshold value voltage in each of the pixels.

It is preferable that the electric optical apparatus have a third transistor, a fourth transistor and a capacitance element that are connected to the gate of the second transistor when the first switch circuit becomes the first transistor and the second switch circuit becomes the second transistor, wherein the first transistor connects a source to the first control line, connects a drain to the potential control line and connects a gate to the scanning line, the second transistor connects the source to the second control line and connects the drain to the potential control line, the third transistor connects the source to the third control line, connects the drain to the gate of the second transistor and connects the gate to the scanning line, the fourth transistor connects the source to the fourth control line, connects the drain to the gate of the second transistor and connects the gate to the other scanning line different from the scanning line, and the capacitance element connects one side electrode to the gate of the second transistor and connects the other side electrode to a constant potential line.

According to the invention, the electric optical apparatus can be performed with a minimum element configuration in which the desired potential can be input to the potential control line synchronized with the selection operation of the scanning line.

It is preferable that the electric optical apparatus have a fifth control line that is connected to the potential control section and a fifth transistor that switches the connection between a sixth control line and the gate of the second transistor on the basis of the input signal from the fifth control line.

According to the invention, since the second transistor can be forcedly made to perform an ON-OFF operation through the fifth transistor by the input signal, the configuration can be made in which an initial potential can be given with respect to the potential control line. Thus, operation defects of the pixel caused by inconstant potential of the potential control line can be prevented from occurring.

It is preferable that the electric optical apparatus have a control section that performs, when the image is displayed on the display section, a precharge operation that charges the maintenance capacitance, a threshold value voltage correction operation in which a portion of charges that is precharged is drawn out through the transistor for correction so that the gate potential of the driving transistor is the threshold value voltage, a program operation that inputs the image signal to the capacitance for modulation through the control transistor, and a display driving operation that changes the potential of the power-supply line and supplies current to the pixel electrode through the driving transistor.

According to the invention, the image signal is input after the threshold value voltage of the driving transistor is corrected, and on the basis of the image signal, the current can be supplied to the pixel current. Thus, a uniform tone display in which the influence of the variation of the threshold value voltage is removed can be obtained.

It is preferable that the electric optical apparatus have the control section that performs, when the image is displayed on the display section, a precharge operation that charges the maintenance capacitance in the state that the reference potential is input to the power-supply line and a potential that is higher than the reference potential is input to the potential control line that is connected to the other side terminal of the transistor for correction, a correction program operation in which a potential that is different from the reference potential is input to the potential control line, after the threshold value voltage correction operation in which a portion of charges that is precharged is drawn out through the transistor for correction by inputting the reference potential to the potential control line and the gate potential of the driving transistor is the threshold value voltage is performed, simultaneously with the program operation that inputs the image signal to the capacitance for modulation through the data line, and a display driving operation that inputs the reference potential to the potential control line, changes the potential of the power-supply line and supplies the current to the pixel electrode through the driving transistor.

According to the invention, the threshold value voltage of the driving transistor is corrected in the state where the image signal is input, so that the electric optical apparatus can relatively quickly perform the correction of the threshold value voltage and the image signal input.

It is preferable that the electric optical apparatus have the control section that performs, when the image is displayed on the display section, a precharge operation that charges the maintenance capacitance in the state that the reference potential is input to the power-supply line and a potential that is lower than the reference potential is input to the potential control line that is connected to the other side terminal of the maintenance capacitance, a correction program operation in which a potential that is different from the reference potential is input to the potential control line, after the threshold value voltage correction operation in which a portion of a charges that is precharged is drawn out through the transistor for correction by inputting the reference potential to the potential control line and the gate potential of the driving transistor is the threshold value voltage is performed, simultaneously with the program operation that inputs the image signal to the capacitance for modulation through the data line, and a display driving operation that inputs the reference potential to the potential control line, changes the potential of the power-supply line and supplies the current to the pixel electrode through the driving transistor.

According to the invention, the threshold value voltage of the driving transistor is corrected in the state where the image signal is input, so that the electric optical apparatus can relatively quickly perform the correction of the threshold value voltage and the image signal input.

It is preferable that a ramp waveform be input to the power-supply line in the display driving operation.

According to the invention, the ON timing of the driving transistor can be defined by the potential level of the image signal and the length of the current supply period with respect to the pixel electrode can be defined so that the pulse width of the driving of the pixel can be controlled and the current variation can be prevented in each of the driving transistors.

According to another aspect of the invention, there is provided a driving method of an electric optical apparatus including a display section in which an electric optical material is pinched between a pair of substrates and a plurality of pixels is arranged, wherein the display section is provided with a scanning line, a data line and a power-supply line that are connected to each of the pixels, each of the pixels is provided with a pixel electrode, a driving transistor that is connected between the pixel electrode and the power-supply line, a capacitance for modulation that is connected between a gate of the driving transistor and the data line, a maintenance capacitance that connects one side electrode to the gate of the driving transistor, a transistor for correction that is connected to a diode and in which a terminal thereof is connected the gate of the driving transistor, and a control transistor that is connected between the capacitance for modulation and the data line, wherein displaying the image in which the image is displayed on the display section including: precharging in which the maintenance capacitance is charged; correcting the threshold value voltage in which a portion of the potential that is precharged is drawn out through the transistor for correction so that the gate potential of the driving transistor is the threshold value voltage; programming in which the image signal is input to the capacitance for modulation through the control transistor; and driving the display in which the potential of the power-supply line is changed and a current is supplied to the pixel electrode through the driving transistor.

According to the driving method, the image signal can be input after the threshold value voltage of the driving transistor is corrected, and on the basis of the image signal, the current can be supplied to the pixel electrode. Thus, the influence of the variation of the threshold value voltage can be removed, and the high quality image display which decrease the unevenness display can be obtained.

According to still another aspect of the invention, there is provided a driving method of an electric optical apparatus including a display section in which an electric optical material is pinched between a pair of substrates and a plurality of pixels is arranged, wherein the display section is provided with a scanning line, a data line and a power-supply line that are connected to each of the pixels, each of the pixels is provided with a pixel electrode, a driving transistor that is connected between the pixel electrode and the power-supply line, a capacitance for modulation that is connected between a gate of the driving transistor and the data line, a maintenance capacitance that connects one side electrode to the gate of the driving transistor, a transistor for correction that is connected to a diode and in which a terminal thereof is connected the gate of the driving transistor, and a potential control line that is connected to the other side terminal of the transistor for correction, wherein displaying the image in which the image is displayed on the display section including: precharging in which the maintenance capacitance is charged in a state that the reference potential is input to the power-supply line and a potential higher than the reference potential is input to the potential control line that is connected to the other terminal of the transistor for correction, correction programming in which a potential that is different from the reference potential is input to the potential control line, after the threshold value voltage correction operation in which a portion of charges that is precharged is drawn out through the transistor for correction by inputting the reference potential to the potential control line and the gate potential of the driving transistor is the threshold value voltage, simultaneously with the program operation that inputs the image signal to the capacitance for modulation through the data line, and driving the display in which the reference potential is input to the potential control line, the potential of the power-supply line is changed and the current is supplied to the pixel electrode through the driving transistor.

According to the driving method, the influence of the variation of the threshold value voltage can be removed, and the high quality image display which decrease the unevenness display can be obtained. Furthermore, since the threshold value voltage of the driving transistor is corrected in the state where the image signal is input, the correction of the threshold value voltage and the image signal input can be relatively quickly performed.

According to still another aspect of the invention, there is provided a driving method of an electric optical apparatus including a display section in which an electric optical material is pinched between a pair of substrates and a plurality of pixels is arranged, wherein the display section is provided with a scanning line, a data line and a power-supply line that are connected to each of the pixels, each of the pixels is provided with a pixel electrode, a driving transistor that is connected between the pixel electrode and the power-supply line, a capacitance for modulation that is connected between a gate of the driving transistor and the data line, a maintenance capacitance that connects one side electrode to the gate of the driving transistor, a transistor for correction that is connected to a diode and in which a terminal thereof is connected the gate of the driving transistor, and a potential control line that is connected to the other side electrode of the maintenance capacitance, wherein displaying the image in which the image is displayed on the display section including: precharging in which the maintenance capacitance is charged in a state that the reference potential is input to the power-supply line and a potential lower than the reference potential is input to the potential control line that is connected to the other electrode of the maintenance capacitance, correction programming in which a potential that is different from the reference potential is input to the potential control line, after the threshold value voltage correction operation in which a portion of potentials that is precharged is drawn out through the transistor for correction by inputting the reference potential to the potential control line and the gate potential of the driving transistor is the threshold value voltage is performed, simultaneously with the program operation that inputs the image signal to the capacitance for modulation through the data line, and driving the display in which the reference potential is input to the potential control line, the potential of the power-supply line is changed and the current is supplied to the pixel electrode through the driving transistor.

According to the driving method, the influence of the variation of the threshold value voltage can be removed, and the high quality image display which decreases the unevenness display can be obtained. Furthermore, since the threshold value voltage of the driving transistor is corrected in the state where the image signal is input, the correction of the threshold value voltage and the image signal input can be relatively quickly performed.

It is preferable that a ramp waveform be input to the power-supply line in the driving the display.

According to the invention, the ON timing of the driving transistor can be defined by the potential level of the image signal and the length of the current supply period with respect to the pixel electrode can be defined so that the pulse width of the driving of the pixel can be controlled and the current variation can be prevented in each of the driving transistors.

It is preferable that the potential of the scanning line be input to the maintenance capacitance in the precharging.

According to the driving method, the precharging can be performed without separately providing the power-supply for the precharge.

According to still another aspect of the invention, there is provided an electronic device including the above-described electric optical apparatus.

According to the invention, the electronic device can be obtained with high quality image display, which decreases the unevenness display.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
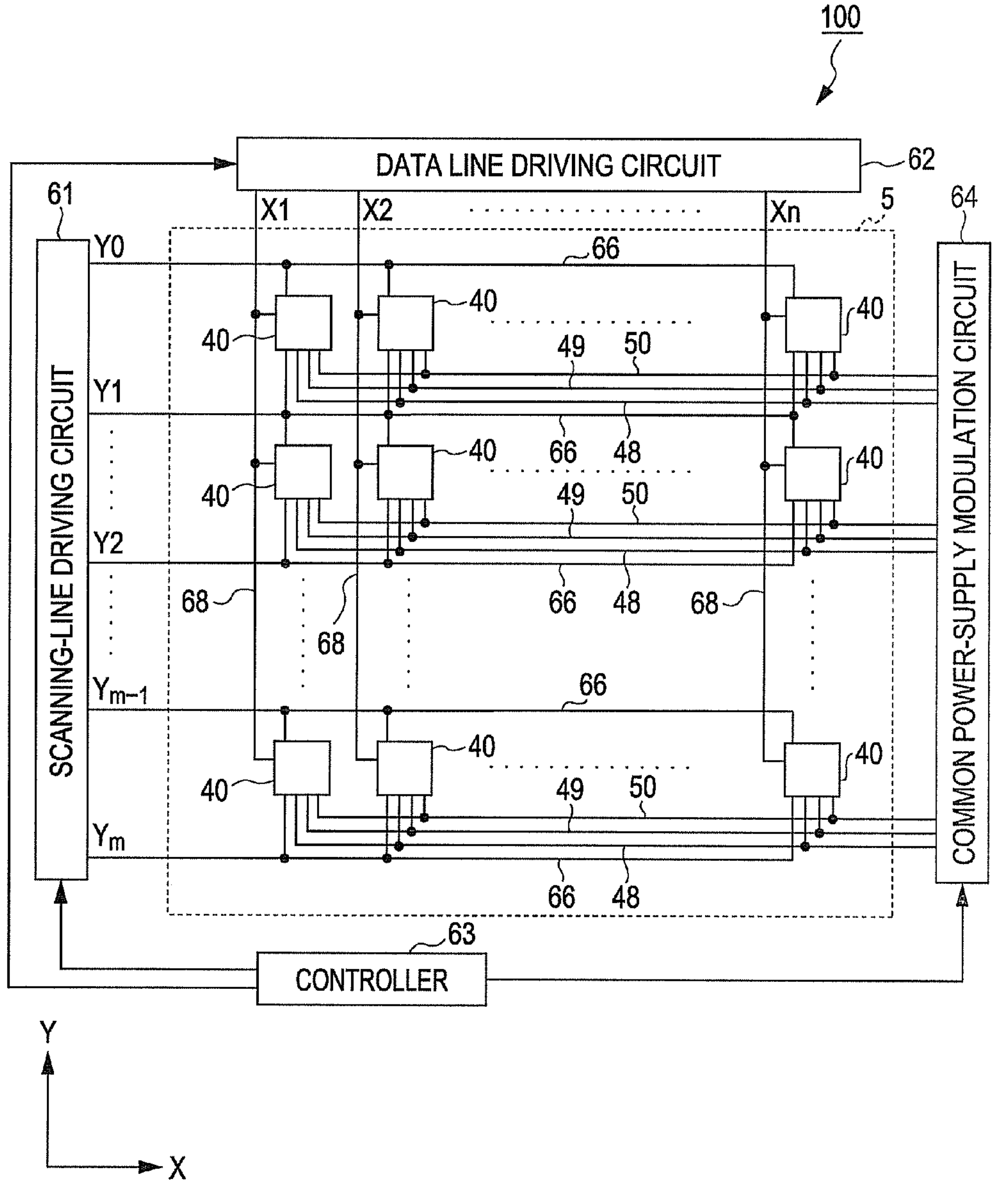
FIG. 1 is a schematic configuration view showing an electrophoretic display apparatus according to the first embodiment.

Here in below, the electrophoretic display apparatus and a driving method thereof of the invention will be described with reference to the drawings.

The scope of the invention is not limited to the embodiments described below and various modifications can be made within the technical thought of the invention. In the drawings following, scale or the number of structures in practice may be different for easy understanding of the each of the structures.

First Embodiment

FIG. 1 is a schematic configuration view showing an electrophoretic display apparatus 100 according to a first embodiment of an electric optical apparatus of the invention.

The electrophoretic display apparatus 100 includes a display section 5 in which a plurality of pixels 40 is arranged in a matrix shape. A scanning line driving circuit 61, a data line driving circuit 62, a controller (control section) 63 and a common power-supply modulation circuit 64 are arranged in the vicinity of the display section 5. The scanning line driving circuit 61, the data line driving circuit 62, and the common power-supply modulation circuit 64 are each connected to the controller 63. The controller 63 entirely controls those on the basis of image data or synchronizing signals that are supplied from an upper rank apparatus.

A plurality of scanning lines 66 that is extended from the scanning line driving circuit 61 and a plurality of the data lines 68 that is extended from the data line driving circuit 62 are formed at the display section 5, and the pixel 40 is provided correspond to an intersecting position thereof. First potential control lines 48, second potential control lines 49 and power-supply lines 50 are extended from the common power-supply modulation circuit 64, and each of the wirings is connected to the pixel 40. The first potential control lines 48, the second potential control lines 49 and the power-supply lines 50 are provided to correspond to the scanning lines 66 of each rows, and the common power-supply modulation circuit 64 is constituted so as to individually input a potential with respect to the first potential control lines 48, the second potential control lines 49 and the power-supply lines 50 thereof.

The scanning line driving circuit 61 is connected to each of the pixels 40 through m scanning lines 66 (Y0, Y1, Y2, . . . , Ym), selects the scanning lines 66 from 0 row to m$^{th}$ row in this order, and supplies the selection signal that defines ON timing of a control transistor TRm (see FIG. 2) provided at the pixel 40 through the selected scanning lines 66 under the control of the controller 63.

Also, a scanning line Y0 in 0 row is a wiring that is used in precharge of a maintenance capacitance C1 and is not used in display in practice (not used in input of the selection signal).

The data line driving circuit 62 is connected to each of the pixels 40 through n data lines 68 (X1, X2, . . . , Xn) and supplies the image signal that defines the pixel data corresponding to each of the pixels 40 to the pixel 40 under the control of the controller 63. The common power-supply modulation circuit 64 generates all kinds of signals to be supplied to each of the wirings that are connected to the circuits, while electrical connection and cutting of each of the wirings is performed (hi-impedance (Hi-Z)) under the control of the controller 63.

Figure 2:
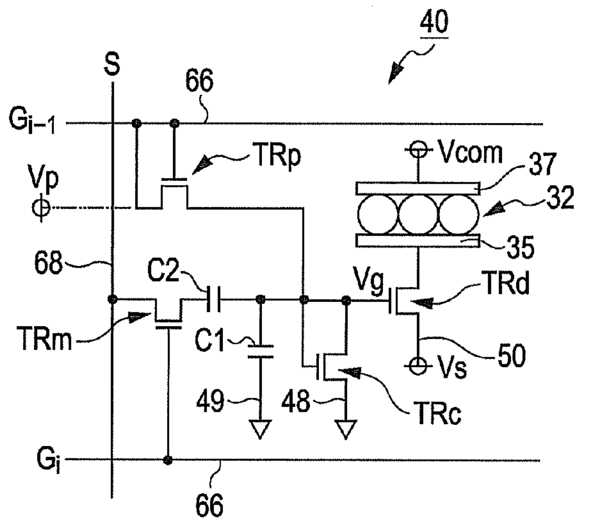
FIG. 2 is a pixel circuit view according to the first embodiment.

FIG. 2 is a circuit configuration view of the pixel 40.

The pixel 40 is provided with the control transistor TRm, a driving transistor TRd, a transistor for correction TRc, a transistor for precharge TRp (switching element for precharge), the maintenance capacitance C1, a capacitance for modulation C2, a pixel electrode 35, an electrophoretic elements 32 and a common electrode 37. Also, the scanning lines 66, the data lines 68, the first potential control lines 48, the second potential control lines 49 and the power-supply lines 50 are connected to the pixel 40. The control transistor TRm, the driving transistor TRd, the transistor for correction TRc that is connected to a diode and the transistor for precharge TRp are all N-MOS (Negative Metal Oxide Semiconductor) transistors.

Each of the transistors constituting the pixel 40 may be substituted with a different kind of the switching element that has a similar function thereof. For example, P-MOS transistor may be used instead of N-MOS transistor.

The scanning lines 66 (i row) are connected to the gate of the control transistor TRm and the data line 68 is connected to the source in the pixel 40. A drain of the control transistor TRm is connected an electrode of one side of the capacitance for modulation C2. An electrode of other side of the capacitance for modulation C2 is connected to an electrode of one side of the maintenance capacitance C1, an anode terminal (one side terminal) of the transistor for correction TRc that is connected to the diode and the gate of the driving transistor TRd. The source of the driving transistor TRd is connected to the power-supply line 50 and the drain is connected to the pixel electrode 35. The electrophoretic element 32 is pinched between the pixel electrode 35 and the common electrode 37.

Also, a cathode terminal (other side terminal) of the transistor for correction TRc is connected to the first potential control lines 48 and the other side electrode of the maintenance capacitance C1 is connected to the second potential control line 49.

The anode terminal (input terminal) of the transistor for precharge TRp that is connected to the diode is connected to the scanning lines 66 in the former step (i−1 row) and the cathode terminal (output terminal) is connected to the gate of the driving transistor TRd (one side electrode of the maintenance capacitance C1, the other side electrode of the capacitance for modulation C2 and the anode terminal of the transistor for correction TRc). As described above, in the specification, when N-MOS transistor is connected to the diode, the gate and drain terminal that are connected to each other are referred to as the anode terminal and the source terminal is referred to as the cathode terminal.

In the pixel 40, the control transistor TRm is a switching element that controls the input of the image signal toward the pixel 40, and the image signal voltage that is supplied through the control transistor TRm, or more specifically, the voltage in which changed voltage is divided in a capacitance ratio between the maintenance capacitance C1 and the capacitance for modulation C2 is overlapped with the original voltage of the maintenance capacitance C1. Thus, the electrophoretic element 32 is driven in a current that according to the gate potential of the driving transistor TRd, in other words, the voltage of the maintenance capacitance C1.

The transistor for precharge TRp is a switching element that precharges the maintenance capacitance C1 according to the selection signal that is supplied through the scanning line 66 in the former step. The transistor for correction TRc draws out a portion of charge that is accumulated in the maintenance capacitance C1 supplied through the transistor for precharge TRp toward the first potential control line the first potential control lines 48, and is an element that corrects a threshold value voltage of the driving transistor TRd.

It is preferable that the transistor for correction TRc be arranged as near as possible to the driving transistor TRd. In the embodiment, based on a premise that the threshold values voltage of transistor for correction TRc and the driving transistor TRd are substantially the same, the threshold value voltage of the transistor for correction TRc is performed and a gate potential Vg (gate voltage) of the driving transistor TRd is adjusted. Thus, the transistor for correction TRc and the driving transistor TRd are arranged near to each other, so that it is preferable that semiconductor that constitutes a channel area of both transistors be easily formed simultaneously and the transistors having the same threshold value voltage are easily formed.

Figure 3A:
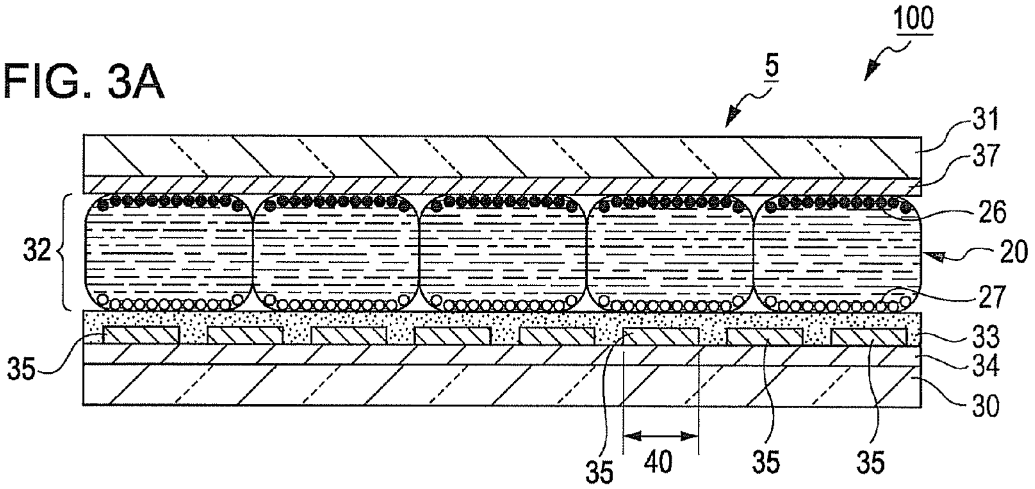
FIGS. 3A and 3B are drawings showing main section of the electrophoretic display apparatus according to the first embodiment.

FIG. 3A is partial cross-sectional view showing parts of the electrophoretic display apparatus 100 in the display section 5. The electrophoretic display apparatus 100 includes a configuration which interposes the electrophoretic element 32 where a plurality of microcapsules 20 is arranged between the element substrate (a first substrate) 30 and an opposing substrate (a second substrate) 31.

In the display section 5, a circuit layer 34 is provided that consists of the scanning lines 66, the data lines 68, the control transistor TRm, the driving transistor TRd and the like shown in FIGS. 1 and 2 in the electrophoretic elements 32 side of the element substrate 30. A plurality of pixel electrodes 35 are arranged and formed on the circuit layer 34.

The element substrate 30 is a substrate that is formed as glass or plastic and may not be transparent since it is arranged opposite side to the image display surface. The pixel electrode 35 may be a laminate of nickel plating and gold plating on Cu (copper) foil in this order, or an electrode that applies voltage to the electrophoretic element 32 formed from Al (aluminum), ITO (indium tin oxide) or the like.

On the other hand, the common electrode 37 having a planar shape that faces to the plurality of pixel electrodes 35 in the electrophoretic element 32 side of the opposing substrate the valve body 31, formed and the electrophoretic element 32 is provided on the common electrode 37.

The opposing substrate 31 is a substrate that is formed as glass or plastic, and is transparent substrate to arrange on the image display surface side. The common electrode 37 is an electrode that applies the voltage to the electrophoretic elements 32 along with the pixel electrode 35, and is a transparent electrode that is formed as MgAg (magnesium-silver), ITO (indium tin oxide), IZO (indium zinc oxide), or the like.

Also, the electrophoretic element 32 and the pixel electrode 35 are attached to each other through the adhesive layer 33 so that the element substrate 30 and the opposing substrate 31 are connected to each other.

The electrophoretic element 32 are formed in advance on the opposing substrate 31 side and are generally handled as an electrophoretic sheet including up to the adhesive layer 33. In the manufacturing process, the electrophoretic sheet is handled in the state where separating type sheet for the protection is attached on the surface of the adhesive layer 33. Thus, the display section 5 is formed by attaching the electrophoretic sheet with the separating type sheet peeled off with respect to the element substrate 30 (pixel electrode 35 and various kinds of circuits are formed) that is manufactured separately. Thus, the adhesive layer 33 is present only on the pixel electrode 35 side.

Figure 3B:
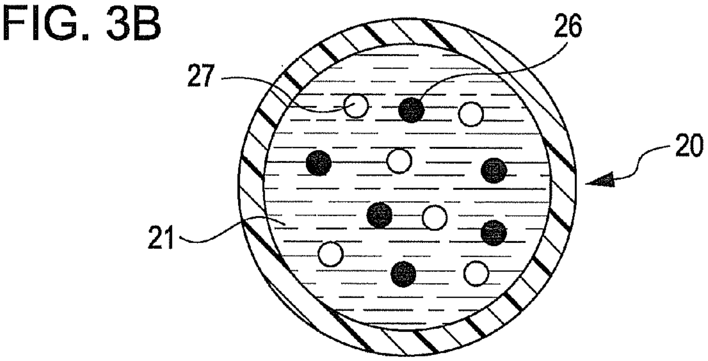

FIG. 3B is diagrammatic cross-sectional view showing the microcapsule 20. The microcapsule 20 has a particle diameter of, for example, about 50 μm and is a spherical body in which a dispersing medium 21, a plurality of the white particles (electrophoretic particles) 27 and a plurality of the black particles (electrophoretic particles) 26 are sealed therein. As shown in FIG. 3A, the microcapsule 20 is pinched between the common electrode 37 and the pixel electrode 35 and one or a plurality of the microcapsules 20 is arranged within one pixel 40.

A shell section (a wall film) of the microcapsule 20 is formed using high molecule resin or the like that has a translucency such as acrylic resin including polymethyl methacrylate, polyethyl methacrylate or the like, urea resin, gum arabic or the like.

The dispersing medium 21 is a liquid in which the white particles 27 and the black particles 26 are dispersed within the microcapsules 20. Examples of the dispersing medium 21 are water, alcoholic solvent (methanol, ethanol, isopropanol, butanol, octanol, methyl cellosolve or the like), esters (ethyl acetate, butyl acetate or the like), ketones (acetone, methyl ethyl ketone, methyl isobutyl ketone or the like), aliphatic hydrocarbon (pentane, hexane, octane or the like), alicyclic hydrocarbon (cyclohexane, methylcyclo hexane or the like), aromatic hydrocarbons (benzene, toluene, benzenes having long-chain alkyl group (xylene, hexylbenzene, heptylbenzene, octylbenzene, nonylbenzene, decylbenzene, undecylbenzene, dodecylbenzene, tridecylbenzene, tetradecylbenzene or the like)), halogenated hydrocarbon (methylene chloride, chloroform, carbon tetrachloride, 1,2-dichloroethane or the like), carboxylate or the like, and oils other than above examples may be used. These materials may be used alone or as compounds, and a surfactant or the like may further be mixed.

The white particles 27 are particles (high molecules or choroids) that consist of a white pigment such as titanium dioxide, zinc oxide, antimony trioxide, and are used when positively charged, for example. The black particles 26 are particles (high molecules or choroids) that consist of a black pigment such as aniline black, carbon black and are used when negatively charged, for example.

The pigment can be added to charge control agent that consists of particles of electrolyte, surfactant, metallic soap, resin, rubber, oil, varnish, compound or the like, dispersant agent such as titanium coupling agent, aluminates coupling agent, silane coupling agent, lubricant, stabilizer or the like according to the necessity.

Also, pigments for example, such as red color, green color, blue color may be used instead of the black particles 26 and the white particles 27. According to the configuration, red color, green color, blue color or the like can be displayed on the display section 5.

Figure 4A:
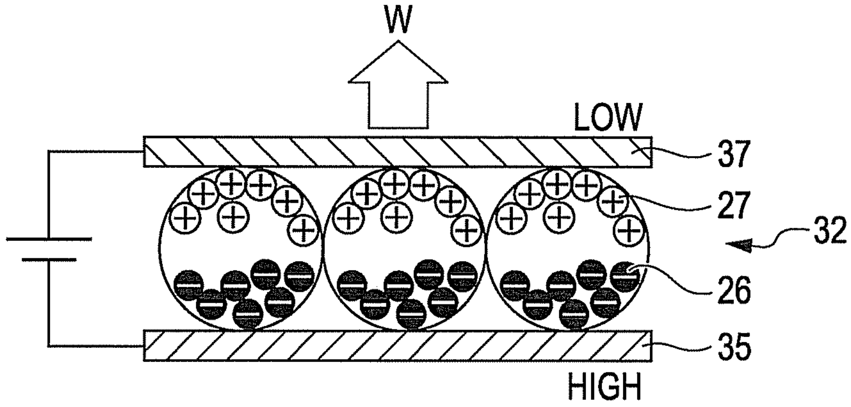
FIGS. 4A and 4B are diagrams showing operation of the electrophoretic display apparatus.
Figure 4B:
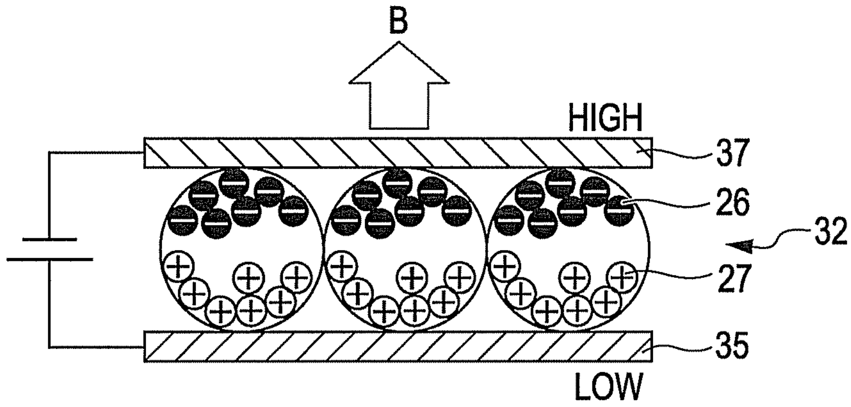

FIGS. 4A and 4B are illustrative drawings showing an operation of the electrophoretic element. FIG. 4A shows in a case where the pixel 40 is a white display and FIG. 4B shows in a case where the pixel 40 is a black display.

In the case of the white display in FIG. 4A, the common electrode 37 is maintained in relatively low potential and the pixel electrode 35 is maintained in a relatively high potential. Accordingly, the white particles 27 that are charged positively are drawn in the common electrode 37, while the black particles 26 that are charged negatively are drawn in the pixel electrode 35. As the result, when the pixel is seen from the common electrode 37 side that becomes the display side, the white color (W) is recognized.

In the case of the black display in FIG. 4B, the common electrode 37 is maintained in relatively high potential and the pixel electrode 35 is maintained in a relatively low potential. Accordingly, the black particles 26 that are charged negatively are drawn in the common electrode 37, while the white particles 27 that are charged positively are drawn in the pixel electrode 35. As the result, when the pixel is seen from the common electrode the sheet material 37 side, the black color (B) is recognized.

FIGS. 4A and 4B are illustrative drawings showing the case that the electrophoretic element is charged in which the black particles are negative and the white particles are positive. However, the black particles may be charged to be positive and the white particles to be negative according to the necessity. In this case, when the potential is supplied in the same manner as the above description, the display in which white display and black display are reversed is obtained.

Driving Method

Hereinafter, the driving method of electrophoretic display apparatus according to the embodiment will be described with reference to FIGS. 5 and 6.

Figure 5:
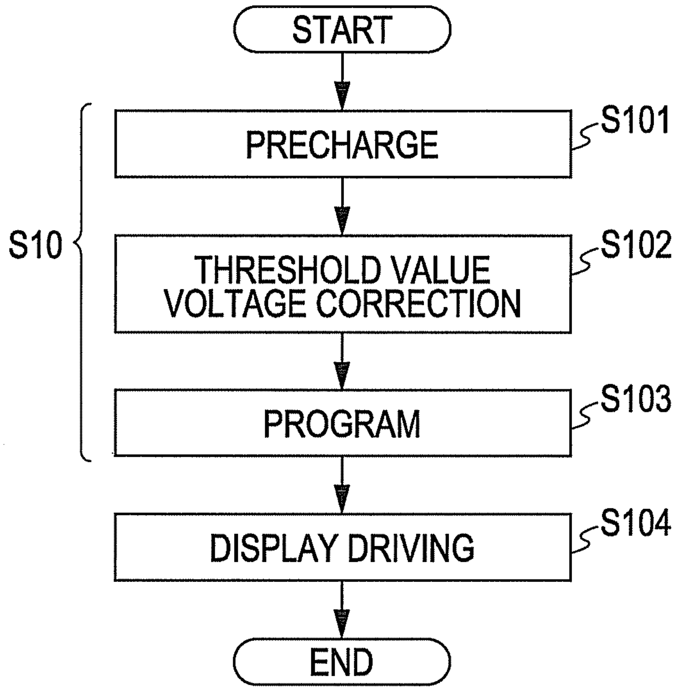
FIG. 5 is a flowchart showing a driving method according to the first embodiment.

FIG. 5 is a flowchart showing a driving method of the electrophoretic display apparatus 100. FIG. 6 is a timing chart corresponding to the flowchart of FIG. 5.

As shown in FIG. 5, the driving method of the embodiment is an image display sequence having a precharge step S101, a threshold value voltage correction step S102, a program step S103 and a display driving step S104.

Figure 6:
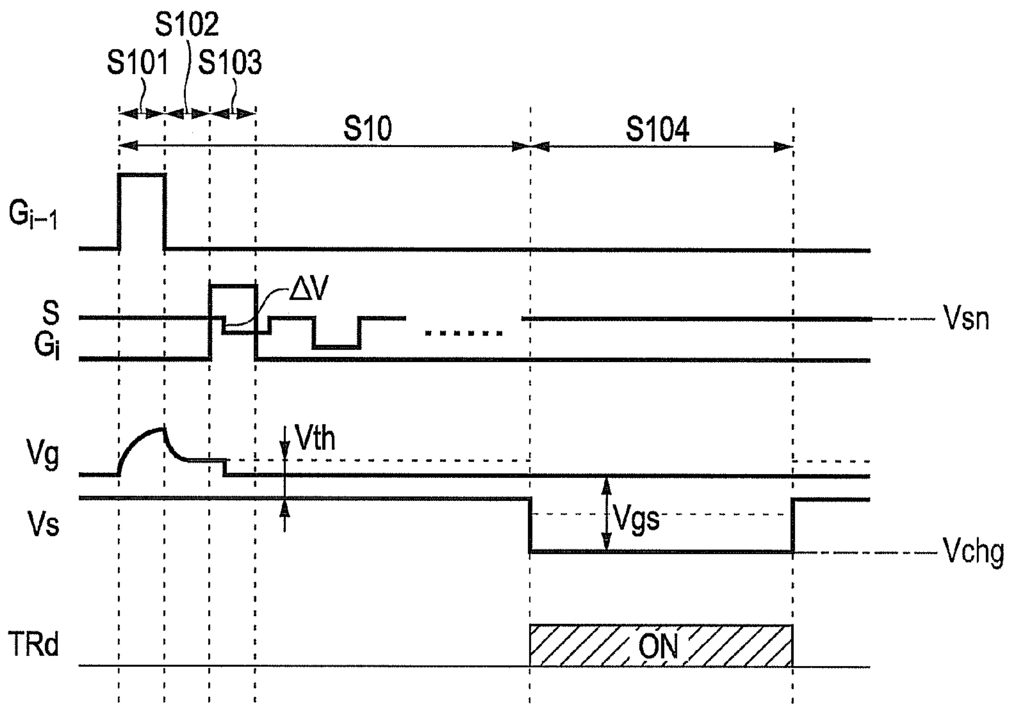
FIG. 6 is a timing chart in the driving method according to the first embodiment.

In FIG. 6, a potential $G_i$ of the scanning line 66 of i row ($1 \leq i \leq m$), a potential $G_{i-1}$ of the scanning lines 66 of (i−1) row, a potential S of the data line 68, a gate potential Vg and a source potential Vs of the driving transistor TRd corresponding to above-described each of the steps are illustrated with ON-OFF state of the driving transistor TRd.

When the image display sequence of the electrophoretic display apparatus 100 according to the embodiment is started, as shown in FIG. 6, the precharge step S101 is performed in a period in which the high-level selection signal is input to the scanning line 66 of (i−1) row. In this period, when the high-level selection signal is input to the scanning lines 66 of (i−1) row, the maintenance capacitance C1 is charged by the current that is supplied through the transistor for precharge TRp. Accordingly, the gate potential Vg of the driving transistor TRd is raised. The gate potential Vg (gate voltage) that is set in the precharge step S101 is not specifically limited if the voltage is higher than a threshold value voltage Vth (a threshold value voltage of the transistor for correction TRc) of the driving transistor TRd. Also, the source potential Vs (potential of the power-supply lines 50) of the driving transistor TRd and the first potential control line 48 are maintained at the same potential, for example, at ground potential (0 V).

At this time, since the scanning line 66 of i row in which the pixel 40 that is an object of the image display operation belongs to, is a low level, the control transistor TRm is maintained in an OFF state.

In the precharge step S101, in the case of i=1, a scanning line of dummy Y0 that is not connected to the control transistor TRm is used as the scanning line 66 of (i−1) row in former step.

After that, when the scanning lines 66 of (i−1) row is transferred to non-selection state (low level), the operation is transferred to the threshold value voltage correction step S102.

In the threshold value voltage correction step S102, both the scanning lines 66 of (i−1) row and the scanning lines 66 of i row are in a non-selection state. Thus, a portion of the charge that is accumulated in the maintenance capacitance C1 is drawn in the first potential control line 48 through the transistor for correction TRc by potential difference between the gate potential Vg and the first potential control lines 48. Accordingly, as shown in FIG. 6, the gate potential Vg is gradually lowered, however when the potential of the anode terminal of the transistor for correction TRc reaches the threshold value voltage, the transistor for correction TRc is in an OFF state so that the gate potential Vg is not lowered after that. Since the transistor for correction TRc and the driving transistor TRd are provided close to each other, both threshold value voltages can be assumed to be the same as each other and the driving transistor TRd is in the state where the gate potential Vg is maintained in the same potential with the threshold value voltage Vth (in the state where the threshold value voltage is corrected).

After that, when the operation is transferred to the program step S103, the selection signal of the high level is input to the scanning line 66 of i row and the image signal in a level corresponding to the tone displayed on the pixel 40 is input to the data line 68. Thus, the image signal is input to the electrode of one side of capacitance for modulation C2 in a period in which the control transistor TRm is in an ON state. Thus, the gate potential Vg is changed by the capacitance coupling operation through the capacitance for modulation C2 and the maintenance capacitance C1 of the pixel 40 is in a state in which the potential is maintained according to the image signal. After that, when the scanning line 66 of i row is transferred to row level, the program step S103 is finished.

In the embodiment, the precharge step S101, the threshold value voltage correction step S102 and the program step S103 are performed in the order with respect to all the pixel 40 of the display section 5 and the maintenance capacitance C1 of each of the pixels 40 is in an state where the potential is maintained according to the image signal. The series of steps are illustrated as the image signal input step 10 in FIGS. 5 and 6.

Also, in each of the pixels 40, the gate potential Vg that is set in the program step S103 is maintained at a potential in which the image signal is reflected until the image signal input step S10 is finished with respect to all the pixels 40. More specifically, the gate potential Vg that is reset in program step S103 is shown by the Equations (1) and (2) using a displacement width ΔV with respect to the reference potential Vsn of the image signal supplied through the data lines 68. $C_1$ is a capacitance of the maintenance capacitance $C_1$ and $C_2$ is a capacitance of capacitance for modulation C2.

$$V_g = V_{th} - K \cdot \Delta V < V_{th} \quad (1)$$

$$K = \frac{C_1}{(C_1 + C_2)} \quad (2)$$

In the embodiment, as shown in FIG. 6, since the potential level of the image signal is defined to a potential that is lower than the reference potential Vsn, the gate voltage (potential Vg) after reflecting the image signal becomes the voltage less than or equal to the threshold value voltage Vth of the driving transistor TRd. Thus, in the period from when the image signal is input to when the display driving step S104 is started, the driving transistor TRd is maintained in an OFF state and the voltage is not applied to the pixel electrode 35 when the image signal input.

Next, when the operation is transferred to the display driving step S104, as shown in FIG. 6, the source potential Vs (potential of the power-supply line 50) of the driving transistor TRd is at a predetermined negative potential −Vchg (Vchg>0). Accordingly, the voltage Vgs between the gate-source of the driving transistor TRd becomes larger than the threshold value voltage Vth and the driving transistor TRd is in an ON state. At least in the display driving step S104, the potential Vcom of the common electrode 37 is set higher than the source potential Vs of the driving transistor TRd.

$$V_{gs} = V_g - (-V_{chg}) = V_{th} - K \cdot \Delta V + V_{chg} \quad (3)$$

At this time, the voltage Vgs between the gate-source is given by the Equation (3) and the current flows according to the voltage Vgs between the gate-source in the driving transistor TRd.

Since the threshold value voltage Vth is corrected in the previous threshold value voltage correction step S102, the current flows in the pixel electrode 35 of each of the pixels 40 according to term −K·ΔV+Vchg that is shown in the Equation (3). Thus, the current flows in the pixel electrode 35 according to the level (ΔV) of the input image signal and the variation in the display concentration between pixels is decreased.

According to the operation of the above-described steps S101 to S104, a predetermined negative potential can be input to the pixel electrode 35 of the pixel 40 and the pixel 40 can display the tone including black (see FIG. 4B).

In a case where the pixel 40 is a white display (display is eliminated), the potential higher than the potential Vcom of the common electrode 37 is supplied to the power-supply line 50 (source potential Vs) and the gate potential Vg that can perform ON operation to the driving transistor TRd may be input with respect to the source potential Vs.

According to the above-described electrophoretic display apparatus and the driving method of the embodiment, the precharge of the maintenance capacitance C1 is performed using the selection signal that is input to the scanning lines 66 of the previous row so that the threshold value voltage of the driving transistor TRd is corrected. After the input (program operation) of the image signal is performed on all rows in the selection period through the row of scanning line 66 itself, high quality tone display without unevenness display can be obtained according to the simple control in which the potential of the power-supply lines 50 is changed in the display driving step S104.

In the embodiment, the description has been given regarding the configuration in which the transistor for precharge TRp that is connected to the diode as the switching element for precharge is provided. However, a typical transistor may be used as the switching element for precharge. In this case, as shown by an imaginary line in FIG. 2, the power-supply line (potential Vp) for precharge may be connected to the source of the transistor for precharge TRp, and when the configuration is composed as described above, the gate potential Vg can be further flexibly controlled in the precharge step S101.

Modified Example

Figure 7:
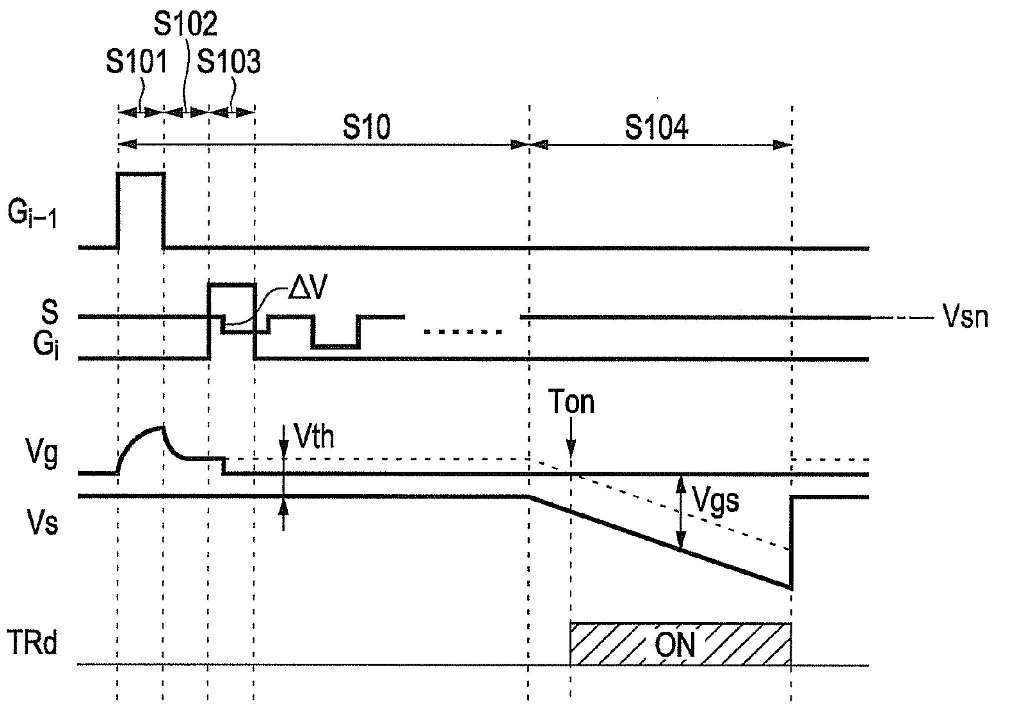
FIG. 7 is a timing chart according to a modified example of the first embodiment.

FIG. 7 is a timing chart showing a modified example of a driving method according the first embodiment.

In the modified example of FIG. 7, a ramp waveform is input to the source (power-supply line 50) of the driving transistor TRd in the display driving step S104 in which the electrophoretic element 32 is driven and the image is displayed. In other words, the common power-supply modulation circuit 64 illustrated in FIG. 1 is configured such that a predetermined shaped ramp waveform can be freely input with respect to the plurality of power-supply lines 50. Also, the image signals input step S10 is the same as that of the first embodiment.

In the driving method of the example, the ramp waveform that is supplied to the power-supply lines 50 is gradually changed to the negative voltage and the voltage Vgs between gate-source of the driving transistor TRd is gradually increased from the start of the input of the ramp waveform as shown in FIG. 7. As illustrated in below Equation (4), the voltage Vramp (source potential Vs) of the ramp waveform becomes large so that the driving transistor TRd is transferred to an ON state and the current starts to flow from the power-supply lines 50 toward the pixel electrode 35 when the voltage Vgs between the gate-source becomes more than or equal to the threshold value voltage Vth (time Ton in FIG. 7). After that, the supply of ramp waveform is continued for a predetermined period and the amount of charge corresponding to the level of the image signal is injected to the pixel electrode 35.

$$V_{gs}=V_g-(-V_{ramp})=V_{th}-K\cdot\Delta V+V_{ramp}\geq V_{th} \tag{4}$$

In the driving method of the electrophoretic display apparatus according to the modified example, when the displacement width ΔV of the image signal with respect to the reference potential becomes large, the period in which the charge is injected to the pixel electrode 35 becomes short, and when the displacement width ΔV becomes small, the charge injection period becomes long. According to the driving method of the example, the driving of the electrophoretic element 32 can be controlled in the pulse width.

In the case of the first embodiment, the current that flows in the pixel electrode 35 is a current that depends on the voltage Vgs between the gate-source. However, in the example, the potential level of the image signal defines ON timing of the driving current. In this case, since the current at ON timing is mainly controlled by the load characteristics of the electrophoretic element 32, current variation does not occur even if variation occurs in a movement degree of the driving transistor TRd, for example. According to the driving method of the example, the unevenness display can be further solved compared to the above-described first embodiment.

Second Embodiment

Figure 8:
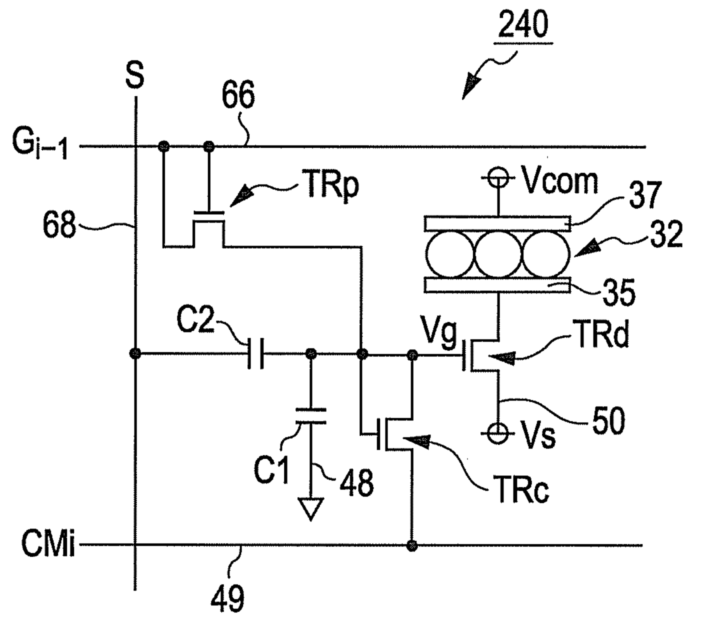
FIG. 8 is a pixel circuit view of the electrophoretic display apparatus according to a second embodiment.

FIG. 8 is a view showing a pixel circuit of the electrophoretic display apparatus according to a second embodiment. The electrophoretic display apparatus of the embodiment includes a configuration of a pixel 240 illustrated in FIG. 8 instead of the pixel 40 according to the first embodiment.

The electrophoretic display apparatus of the embodiment has a basic configuration similar to the electrophoretic display apparatus 100 according to the above-described first embodiment and the constituent elements similar to the first embodiment are given the same reference numbers thereof, and are thus are not specifically described in the below description and reference drawings.

The driving transistor TRd, the transistor for correction TRc, the transistor for precharge TRp, the maintenance capacitance C1, the capacitance for modulation C2, the pixel electrode 35, the electrophoretic element 32 and the common electrode 37 are provided in the pixel 240 shown in FIG. 8. Also, the scanning line 66, the data line 68, the first potential control line 48, the second potential control line 49 and the power-supply line 50 are connected in the pixel 240. The driving transistor TRd, the transistor for correction TRc and the transistor for precharge TRp that is connected to the diode are all N-MOS transistors. Each of the transistors constituting the pixel 240 may be substituted with a different kind of switching element that has the same function.

As shown in FIG. 8, in the pixel 240 according to the embodiment, the control transistor TRm is not provided and the electrode of one side of the capacitance for modulation C2 is connected to the data line 68. The common power-supply modulation circuit 64 has a configuration in which a desired potential CMi (i is a integer number (1≤i≤m) illustrating the number of rows) can be input with respect to the first potential control lines 48 that is connected to the cathode terminal (other side terminal) of the transistor for correction TRc. The configuration except for the above description is the same as the pixel 40 according to the first embodiment.

Driving Method

Next, the driving method of the electrophoretic display apparatus according to the embodiment will be described.

Figure 9:
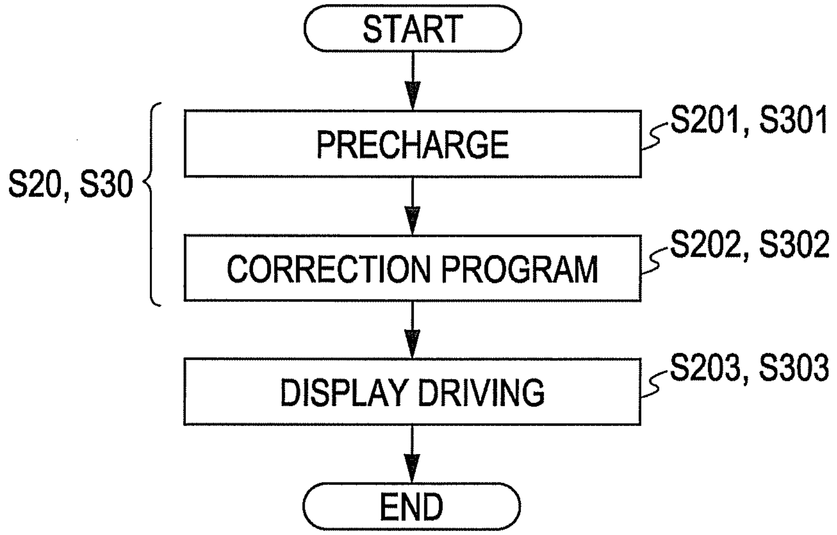
FIG. 9 is a flowchart showing the driving method according to the second embodiment.

FIG. 9 is a flowchart showing the driving method according to the embodiment. As shown in FIG. 9, the driving method of the embodiment includes the image display sequence having a precharge step S201, a correction program step S202 and a display driving step S203.

Figure 10:
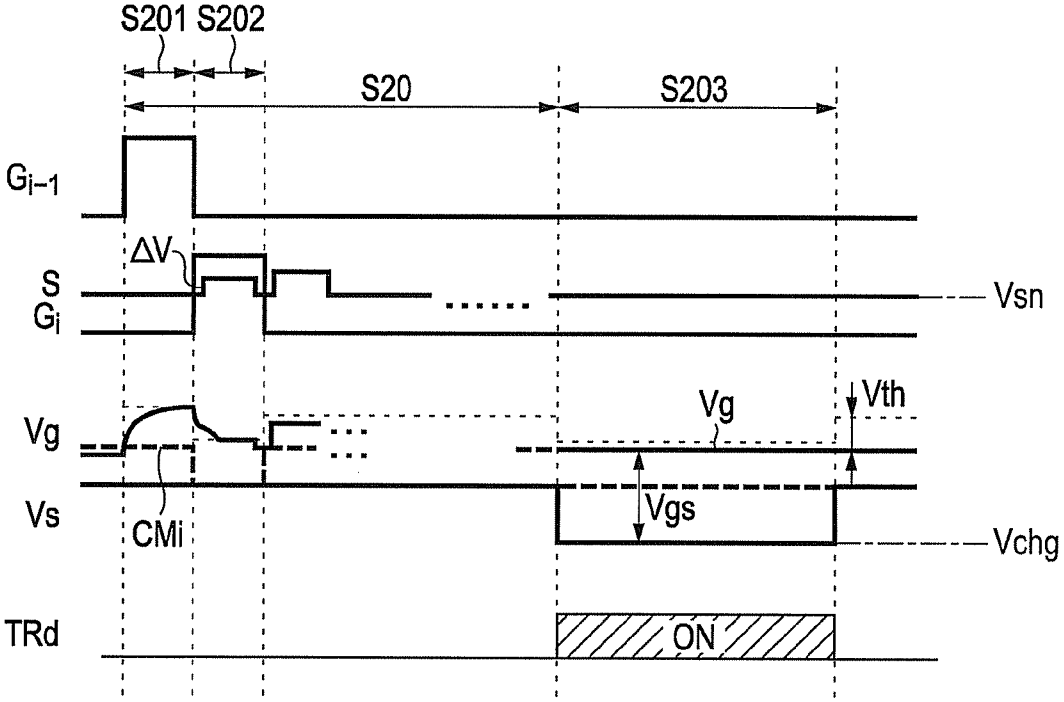
FIG. 10 is a timing chart in the driving method according to the second embodiment.

FIG. 10 is a timing chart of the driving method according to the embodiment. In FIG. 10, a potential $G_i$ of the scanning line 66 of i row (1≤i≤m), a potential of the scanning line 66 of (i−1) row, a potential S of the data line 68, a gate potential Vg and a source potential Vs of the driving transistor TRd corresponding to each of steps are illustrated with ON-OFF state of the driving transistor TRd.

When the image display sequence of the electrophoretic display apparatus according to the embodiment is started, as shown in FIG. 10, the precharge step S201 is performed in a period in which the high-level selection signal is input to the scanning line 66 of (i−1) row. In this period, when the high-level selection signal is input to the scanning lines 66 of (i−1) row, the maintenance capacitance C1 is charged by the current that is supplied through the transistor for precharge TRp and thus the gate potential Vg of the driving transistor TRd is raised. The gate potential Vg that is set in the precharge step S201 is not specifically limited if the voltage is higher than a threshold value voltage Vth (threshold value voltage of the transistor for correction TRc) of the driving transistor TRd.

In the precharge step S201, in the case of i=1, a dummy scanning line Y0 is used as the scanning line 66 row (i−1) of the previous step.

After that, when the scanning lines 66 of (i−1) row is transferred to non-selection state (low level), the operation is transferred to the correction program step S202. In the correction program step S202 of the embodiment, the threshold value voltage correction operation and program operation that are performed in two steps (Step S102 and S103) in the first embodiment are performed simultaneously.

In the correction program step S202, the scanning line 66 of i row is in the selection state. Therewith, the potential CMi of the first potential control line 48 is set to the ground potential (0 V) that is the same as the source potential of the driving transistor TRd and the potential S of the data line 68 is set to the potential (for example, Vsn+ΔV) according to the display tone from the reference potential Vsn.

Then, the potential of the gate potential Vg is raised through the capacitance for modulation C2 by the potential input toward the data line 68, while a portion of the potential that is accumulated in the maintenance capacitance C1 is drawn to the first potential control line 48 through the transistor for correction TRc by the potential difference between the gate potential Vg and the first potential control lines 48 (ground potential).

Thus, as shown in FIG. 10, the gate potential Vg is lowered gradually. However, when the potential of the anode terminal of the transistor for correction TRc reaches the threshold value voltage of the transistor for correction TRc, the transistor for correction TRc is in an OFF state and after that, the gate potential Vg is not decreased. Since the electrode of one side of the capacitance for modulation C2 is maintained at the potential of the data lines 68 in which the image signal is input, the gate voltage (potential Vg) at the time that the potential is constant is set to be the same as the threshold value voltage of the transistor for correction TRc in the state where the image signal is included. Thus, the pixel 40 is in a state in which the potential is maintained according to the image signal in the maintenance capacitance C1 by the correction program step S202.

After that, the scanning lines 66 of i row is transferred to a low level, the first potential control line 48 is changed to a positive potential and the correction program step S202 is finished.

In the embodiment, the precharge step S201 and the correction program step S202 are performed in order with respect to all the pixels 40 of the display section 5 and the potential according to the image signal is maintained in the maintenance capacitance C1 of each of the pixel 40. The series of the steps are illustrated as the image signal input step S20 in FIGS. 9 and 10.

In each of the pixels 40, the accumulation charge of the maintenance capacitance C1 that is set in the correction program step S202 is effectively maintained in the period until the image signal input step S20 is finished with respect to all the pixels 40. This is performed by returning the first potential control line 48 to the positive potential when the correction program step S202 is finished. When the program (correction program step S202) is performed toward the pixel 40 that belongs to the scanning line 66 of another row, the gate potential Vg is changed through the capacitance for modulation C2 by the capacitance coupling since the potential of the data line 68 is changed. At this time, when the cathode terminal of the transistor for correction TRc is maintained at the positive potential, the transistor for correction TRc can be maintained in an OFF state and the charge amount that is accumulated in the maintenance capacitance C1 can be maintained even if the gate potential Vg is changed.

When the operation is transferred to the display driving step S203, as shown in FIG. 10, the source potential Vs (potential of the power-supply line 50) of the driving transistor TRd is set to a predetermined negative potential −Vchg (Vchg>0) and the potential CMi of the first potential control line 48 is set to the ground potential (0 V). In the correction program step S202, the potential (gate potential Vg) of the electrode of one side of the maintenance capacitance C1 is the threshold value voltage Vth in the state where the potential of the data line 68 (electrode of one side of the capacitance for modulation C2) is Vsn+ΔV. In the display driving step S203, the data line 68 is returned to the reference potential Vsn. As described above, the gate potential Vg of the driving transistor TRd becomes Vth−K·ΔV in the display driving step S203. The source potential Vs of the driving transistor TRd becomes a negative potential −Vchg, so that the voltage Vgs between the gate-source becomes the same voltage as Equation (3) illustrated in the first embodiment.

According to the above-described operation, in the display driving step S203, the gate voltage of the driving transistor TRd becomes larger than the threshold value voltage Vth and the driving transistor TRd is in an ON state. The current according to the voltage Vgs between the gate-source flows to the pixel electrode 35 through the driving transistor TRd from the power-supply line 50.

According to the operation of the above-described steps S201 to S203, a predetermined negative potential can be input to the pixel electrode 35 of the pixel 240 and the pixel 240 can be a black display. In a case where the pixel 240 is a white display (display is eliminated), the potential (source potential Vs) higher than the potential Vcom of the common electrode 37 is supplied to the power-supply line 50 and the gate potential Vg that can perform ON operation may be input to the driving transistor TRd with respect to the source potential Vs.

According to the above-described electrophoretic display apparatus and the driving method of the embodiment, in the correction program step S202, the threshold value voltage correction operation of the driving transistor TRd and the program operation of the pixel 240 by the image signal input can be performed simultaneously. Thus, high quality tone display can be obtained without unevenness display by the simple circuit and the simple control compared to the first embodiment.

Even in the embodiment, of course, the ramp waveform may be input to the power-supply lines 50 in the display driving step S203 similar to the modified example of the first embodiment.

The power-supply for precharge (a potential Vp) is connected to the source of the transistor for precharge TRp and the power-supply for precharge is switched and then the precharge of the maintenance capacitance C1 may be performed by the input of the selection signal through the scanning lines 66 of all rows.

In the embodiment, the potential S of the data line 68 is returned to the reference potential Vsn when the correction program step S202 is finished. However, the potential S of the data line 68 does not need to be returned to the reference potential Vsn in every correction program step S202 in the case where the precharge step S201 and the correction program step S202 are performed repeatedly. The potential S of the data line 68 may be the reference potential Vsn when the image signal input step S20 is finished.

Third Embodiment

Figure 11:
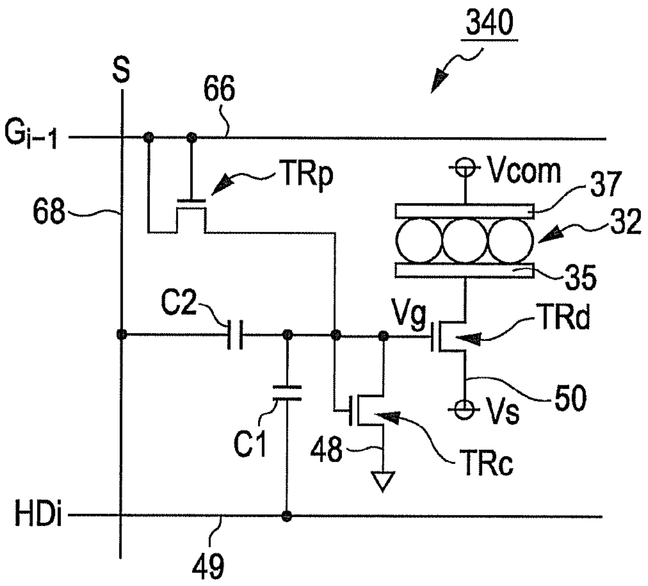
FIG. 11 is a pixel circuit view of the electrophoretic display apparatus according to a third embodiment.

FIG. 11 is a view showing a pixel circuit of the electrophoretic display apparatus according to a third embodiment. The electrophoretic display apparatus of the embodiment includes a configuration of a pixel 340 illustrated in FIG. 11 instead of the pixel 40 according to the first embodiment.

The electrophoretic display apparatus of the embodiment has a basic configuration similar to the electrophoretic display apparatus 100 according to the above-described first embodiment and the constituent elements similar to the first embodiment are given the same reference numbers thereof, and are thus are not specifically described in the below description and drawings.

The driving transistor TRd, the transistor for correction TRc, the transistor for precharge TRp, the maintenance capacitance C1, the capacitance for modulation C2, the pixel electrode 35, the electrophoretic element 32 and the common electrode 37 are provided in the pixel 340 shown in FIG. 11. Also, the scanning line 66, the data line 68, the first potential control line 48, the second potential control line 49 and the power-supply line 50 are connected in the pixel 340. The driving transistor TRd, the transistor for correction TRc and the transistor for precharge TRp that is connected to the diode are all N-MOS transistors. Each of the transistors constituting the pixel 340 may be substituted with a different kind of switching element that has the same function.

As shown in FIG. 11, in the pixel 340 according to the embodiment, the control transistor TRm is not provided and the electrode of one side of the capacitance for modulation C2 is connected to the data line 68. The common power-supply modulation circuit 64 has a configuration in which a desired potential HDi (i is a integer number (1≤i≤m) illustrating the number of row) can be input with respect to the second potential control line 49 connected to the electrode (electrode opposite side to the electrode connected to the driving transistor TRd) of the other side of the maintenance capacitance C1. The configuration except for the above description is the same as the pixel 40 according to the first embodiment.

Driving Method

Next, the driving method of the electrophoretic display apparatus according to the embodiment will be described.

The flowchart of the driving method of the embodiment is similar to that of the second embodiment shown FIG. 9. In other words, the driving method of the embodiment includes the image display sequence having a precharge step S301, a correction program step S302 and a display driving step S303.

Figure 12:
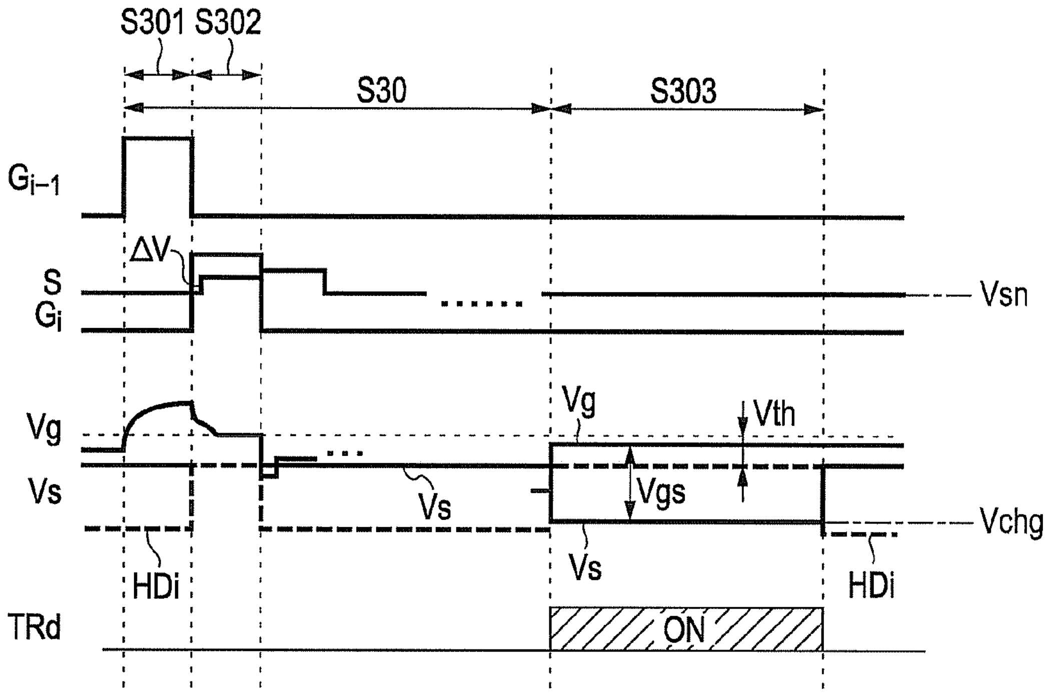
FIG. 12 is a timing chart in the driving method according to the third embodiment.

FIG. 12 is a timing chart in the driving method according to the embodiment. In FIG. 12, the potential $G_i$ of the scanning line 66 of i row (1≤i≤m), the potential $G_{i-1}$ of the scanning lines 66 of (i−1) row, the potential S of the data line 68, the gate potential Vg and the source potential Vs of the driving transistor TRd corresponding to each of steps are illustrated with ON-OFF state of the driving transistor TRd.

When the image display sequence of the electrophoretic display apparatus according to the embodiment is started, as shown in FIG. 12, a precharge step S301 is performed in a period in which the high-level selection signal is input to the scanning line 66 of (i−1) row. In this period, when the high-level selection signal is input to the scanning line 66 of (i−1) row, the maintenance capacitance C1 is charged by the current that is supplied through the transistor for precharge TRp, and then the gate potential Vg of the driving transistor TRd is raised. The gate potential Vg that is set in the precharge step S301 is not specifically limited if the voltage is higher than the threshold value voltage Vth (threshold value voltage of the transistor for correction TRc) of the driving transistor TRd.

In the precharge step S301, in the case of i=1, a dummy scanning line Y0 is used as the scanning line 66 of prior step (i−1) row.

After that, when the scanning line 66 of (i−1) row is transferred to non-selection state (low level), the operation is transferred to the correction program step S302. In the correction program step S302 of the embodiment, the threshold value voltage correction operation and the program operation that are performed in two steps (Step S102 and S103) in the first embodiment are performed simultaneously.

In the correction program step S302, the scanning line 66 of i row is in the selection state. Therewith, the potential HDi of the second potential control line 49 is set to the ground potential (0 V) and the potential S of the data line 68 is set to the potential (for example, Vsn+ΔV) according to the display tone from the reference potential Vsn.

Then, the potential of the gate potential Vg is raised through the capacitance for modulation C2 by the potential input toward the data line 68, while a portion of the charge that is accumulated in the maintenance capacitance C1 is drawn to the first potential control line 48 through the transistor for correction TRc by the potential difference between the gate potential Vg and the first potential control line 48 (ground potential).

Thus, as shown in FIG. 12, the gate potential Vg is lowered gradually and when the potential of the anode terminal of the transistor for correction TRc reaches the threshold value voltage of the transistor for correction TRc, the transistor for correction TRc is in an OFF state, and after that, the gate potential Vg is not decreased. Since the electrode of one side of the capacitance for modulation C2 is maintained at the potential of the data line 68 in which the image signal is input, the gate voltage (potential Vg) at the time when the potential is in constant, is set to be the same as the threshold value voltage of the transistor for correction TRc in the state that the image signal is included. Thus, the pixel 40 is in the state where the potential is maintained according to the image signal in the maintenance capacitance C1 by the correction program step S302.

After that, the scanning line 66 of i row is transferred to a low level, the second potential control line 49 is changed to a negative potential and the correction program step S302 is finished.

In the embodiment, the precharge step S301 and the correction program step S302 are performed in order with respect to all the pixels 40 of the display section 5 and the potential is maintained at the maintenance capacitance C1 of each of the pixels 40 according to the image signal. The series of the steps are illustrated as the image signal input step S30 in FIGS. 9 and 12.

In each of the pixels 40, the accumulation charge of the maintenance capacitance C1 that is set in the correction program step S302 is effectively maintained in the period until the image signal input step S30 is finished with respect to all the pixels 40. This is performed by returning the second potential control line 49 to the negative potential and lowering the potential level of the gate potential Vg when the correction program step S302 is finished. When the program (correction program step S302) is performed toward the pixel 40 that belongs to the scanning line 66 of another row, since the potential of the data line 68 is changed, the gate potential Vg is changed through the capacitance for modulation C2 by the capacitance coupling. At this time, the electrode of the other side of the maintenance capacitance C1 is maintained at a negative potential so that the gate voltage of the driving transistor TRd can be maintained so as not to exceed the threshold value voltage Vth even if the gate potential Vg is changed, and the voltage is not applied to the pixel electrode 35 during inputting of the image signal. The potential of the second potential control line 49 itself may be any value and may be change to the negative potential side after program.

When the operation is transferred to the display driving step S303, as shown in FIG. 12, the source potential Vs (potential of the power-supply line 50) of the driving transistor TRd is set to a predetermined negative potential −Vchg (Vchg>0) and the potential HDi of the second potential control line 49 is set to the ground potential (0 V). In the correction program step S302, the potential (gate potential Vg) of the electrode of one side of the maintenance capacitance C1 is the threshold value voltage Vth in the state where the potential of the data line 68 (electrode of one side of the capacitance for modulation C2) is Vsn+ΔV. In the display driving step S303, the data line 68 is returned to the reference potential Vsn. As described above, the gate potential Vg of the driving transistor TRd becomes Vth−K·ΔV in the display driving program step S303. The source potential Vs of the driving transistor TRd becomes a negative potential −Vchg so that the voltage Vgs between the gate-source becomes the same voltage as the Equation (3) illustrated in the first embodiment.

According to the above-described operation, in the display driving step S303, the gate voltage of the driving transistor TRd becomes larger than the threshold value voltage Vth and the driving transistor TRd is in an ON state. The current according to the voltage Vgs between the gate-source flows to the pixel electrode 35 through the driving transistor TRd from the power-supply line 50.

According to the operation of the above-described steps S301 to S303, a predetermined negative potential can be input to the pixel electrode 35 of the pixel 340 and the pixel 340 can a black display. In a case where the pixel 340 is white display (display is eliminated), the potential (source potential Vs) higher than the potential Vcom of the common electrode 37 is supplied to the power-supply line 50 and the gate potential Vg that can perform ON operation may be input to the driving transistor TRd with respect to the source potential Vs.

According to the above-described electrophoretic display apparatus and the driving method of the embodiment, in the correction program step S302, the threshold value voltage correction operation of the driving transistor TRd and the program operation of the pixel 340 by the image signal input can be performed simultaneously. Thus, high quality tone display can be further obtained without unevenness display according to the simple circuit and the simple control compared to the first embodiment.

Even in the embodiment, of course, the ramp waveform may be input to the power-supply lines 50 in the display driving step S303 similar to the modified example of the first embodiment.

The power-supply for precharge (potential Vp) is connected to the source of the transistor for precharge the transistor for precharge TRp, the power-supply for precharge is switched by inputting the selection signal and then the precharge of the maintenance capacitance C1 may be performed through the scanning line 66 of all rows.

In the embodiment, the first potential control line 48 connected to the cathode terminal of the transistor for correction TRc is maintained at a constant potential (0 V). However, the potential CMi can be input similar to the second embodiment.

Fourth Embodiment

A fourth embodiment according to the invention will be described with reference to FIG. 13.

The embodiment relates to configuration of the common power-supply modulation circuit 64 that is preferably used to the electrophoretic display apparatus according to the second and the third embodiments.

Figure 13:
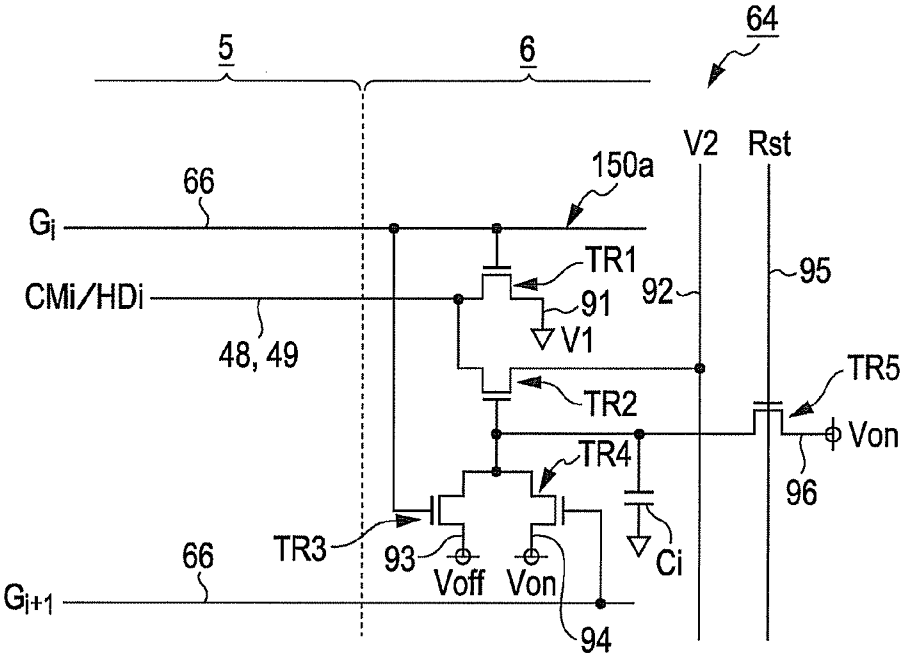
FIG. 13 is a drawing showing a potential control circuit according to a fourth embodiment.

FIG. 13 is a schematic configuration view showing the display section 5 and a non-display section 6 of the electrophoretic display apparatus according to the fourth embodiment.

As shown in FIG. 13, the common power-supply modulation circuit 64 that is provided in the non-display section 6 of the electrophoretic display apparatus of the embodiment includes a potential control circuit 150*a* (a potential control section) that is provided to correspond to the first potential control line 48 or the second potential control line 49 of each of rows, and a first control line 91, a second control line 92, a third control line 93, a fourth control line 94, a fifth control line 95 and the sixth control line 96 are connected to each of the potential control circuits 150*a*.

The potential control circuit 150*a* of the embodiment can be preferably used as a circuit selecting a potential that is input to the first potential control line 48 or the second potential control line 49. Below, description will be given in case where the potential control circuit 150*a* is connected to the first potential control line 48. In a case where the potential control circuit 150*a* is connected to the second potential control line 49, the first potential control line 48 may be substituted to the second potential control line 49 in the below description.

The potential control circuit 150*a* is provided to correspond to each of the first potential control lines 48 that are extended along the scanning line 66. The potential control circuit 150*a* corresponding to the first potential control line 48 of i row ($1 \leq i \leq m$) is connected to the first potential control line 48 of i row, the scanning line 66 of row and the next scanning line 66 of (i+1) row.

The potential control circuit 150*a* includes a first transistor TR1 (a first switch circuit), a second transistor TR2 (a second switch circuit), a third transistor TR3, a fourth transistor TR4, a fifth transistor TR5 and a capacitance Ci.

A gate of the first transistor TR1 is connected to the scanning line 66 of i row, a source is connected to the first control line 91 (a potential V1), and a drain is connected to the first potential control lines 48 of i row.

The gate of the second transistor TR2 is connected to the drain of the third transistor TR3, the drain of the fourth transistor TR4 and an electrode of one side of the capacitance Ci. The source of the second transistor TR2 is connected to the second control line 92 (a potential V2) and the drain is connected to the first potential control line 48 of i row.

The gate of the third transistor TR3 is connected to the scanning line 66 of i row, the source is connected to the third control line 93 (low potential power-supply line) and the drain is connected to the gate of the second transistor TR2.

The gate of the fourth transistor TR4 is connected to the scanning lines 66 of (i+1) row, the source is connected to the fourth control line 94 (high potential power-supply line) and the drain is connected to the gate of the second transistor TR2.

One side electrode of the capacitance Ci is connected to the gate of the second transistor TR2 and the other side electrode is connected to the ground or any potential power-supply.

The fifth transistor TR5 is a switch element that is provided if necessary, the gate of the fifth transistor is connected to the fifth control line 95 (a reset line), the source is connected to the sixth control line 96 (high potential power-supply line) and the drain is connected to one side electrode of the capacitance Ci and the gate of the second transistor TR2.

The potential control circuit 150*a* having the above-described configuration switches the electrical connection of the first control line 91 and the second control line 92 with respect to the first potential control lines 48 by the first transistor TR1 and the second transistor TR2.

The first transistor TR1 is controlled by the selection signal that is input through the scanning line 66 of i row. On the other hand, the second transistor TR2 is controlled by a potential that is output from a circuit consisting of the third transistor TR3, the fourth transistor TR4 and the capacitance Ci. Specifically, the third transistor TR3 outputs a potential Voff (low level) so that the second transistor TR2 is in an OFF state, and the fourth transistor TR4 outputs a potential Von (high level) so that the second transistor TR2 is in an ON state. The capacitance Ci maintains the output potential of the third transistor TR3 or the fourth transistor TR4 for a predetermined period.

In the embodiment, the gate of the fourth transistor TR4 is connected to the scanning line 66 of (i+1) row. However, the gate of the fourth transistor TR4 may be connected to the scanning line 66 of any row if it is not i row.

Also in FIG. 13 of the embodiment, the potential control circuit 150*a* is formed in the drawing on the right side of the display section 5. However, the potential control circuit 150*a* may be connected to an end portion opposite to the first potential control lines 48. In other words, the potential control circuit 150*a* may be arranged along only one side of the display section 5 or may be arranged along two sides opposite to the display section 5. In a case of being arranged along two sides opposite to the display section 5, the arrangement positions of the potential control circuits 150*a* may be divided and arranged to different end portions (right and left of the display section 5) of the first potential control lines 48 in each row.

An example of the image display operation in the electrophoretic display apparatus according to the above-described embodiment will be described.

In the electrophoretic display apparatus including the potential control circuit 150*a* as shown in FIG. 13, when the scanning line 66 of i row is selected, the first transistor TR1 and the third transistor TR3 are in an ON state, the potential V1 (ground potential in the second embodiment) of the first control line 91 is input to the first potential control line 48 through the first transistor TR1. On the other hand, since the third transistor TR3 is in an ON state, the potential Voff of the third control line 93 is input to the gate of the second transistor TR2 and then the second transistor TR2 is maintained in an OFF state, so that an impact of voltage is not occurred in the first potential control lines 48.

Next, when the scanning lines 66 of (i+1) row is selected, the fourth transistor TR4 is in an ON state and the potential Von of the fourth control line 94 is input to the gate of the second transistor TR2 through the fourth transistor TR4. Accordingly, the second transistor TR2 is in an ON state and the potential V2 (predetermined positive potential in the second embodiment) of the second control line 92 is input to the first potential control line 48 through the second transistor TR2. At this time, since the scanning line 66 of i row is in a non-driving-selected state, the first transistor TR1 is in an OFF state, so that the impact of voltage does not occurred in the first potential control line 48.

Next, when the scanning line 66 of (i+1) row is non-selected state, the fourth transistor TR4 is in an OFF state. However, since the capacitance Ci is charged during the period in which the fourth transistor TR4 is in an OFF state, ON state of the second transistor TR2 is maintained by energy that is accumulated in the capacitance Ci and the potential V2 of the second control line 92 is continuously input to the first potential control line 48.

According to the above-described operation, the predetermined potential may be input with respect to the first potential control lines 48 in the image signal input step S20 of the former embodiment.

In the display driving step S203 of the second embodiment, since all scanning lines 66 are in the non-selected states, the potential V2 of the second control line 92 is input to the first potential control lines 48. Thus, in the display driving step S203 in the case where the potential control circuit 150*a* is used, the ground potential (0 V) is input as the potential V2 of the second control line 92.

In the potential control circuit 150*a* of the embodiment, the fifth transistor TR5, the fifth control line 95 and the sixth control line 96 are provided such that the potential of the first potential control lines 48 is not undetermined when the power-supply is input toward the electrophoretic display apparatus. In other words, when the power-supply is input, the selection signal is input to the fifth control line 95 and the fifth transistor TR5 is in an ON state, and then the potential Von of the sixth control line 96 can be input to the gate of the second transistor TR2 through the fifth transistor TR5. Thus, the second transistor TR2 may be forcedly made to be in an ON state and the potential V2 of the second control line 92 can be input to the first potential control line 48, so that the potential of the first potential control line 48 can be prevented from being undetermined.

In each of above-described embodiments, description has been given regarding the electrophoretic display apparatus as an example of electric optical apparatus. However, the technical range of the invention is not limited to the electrophoretic display apparatus and the configuration of the invention can be applied to electric optical apparatus such as organic EL apparatus other than the electrophoretic display apparatus without any problems.

Electronic Device

Next, description will be given in case where the electrophoretic display apparatus 100 of the embodiments and the electrophoretic display apparatus according to the modified examples are applied to an electronic device.

Figure 14:
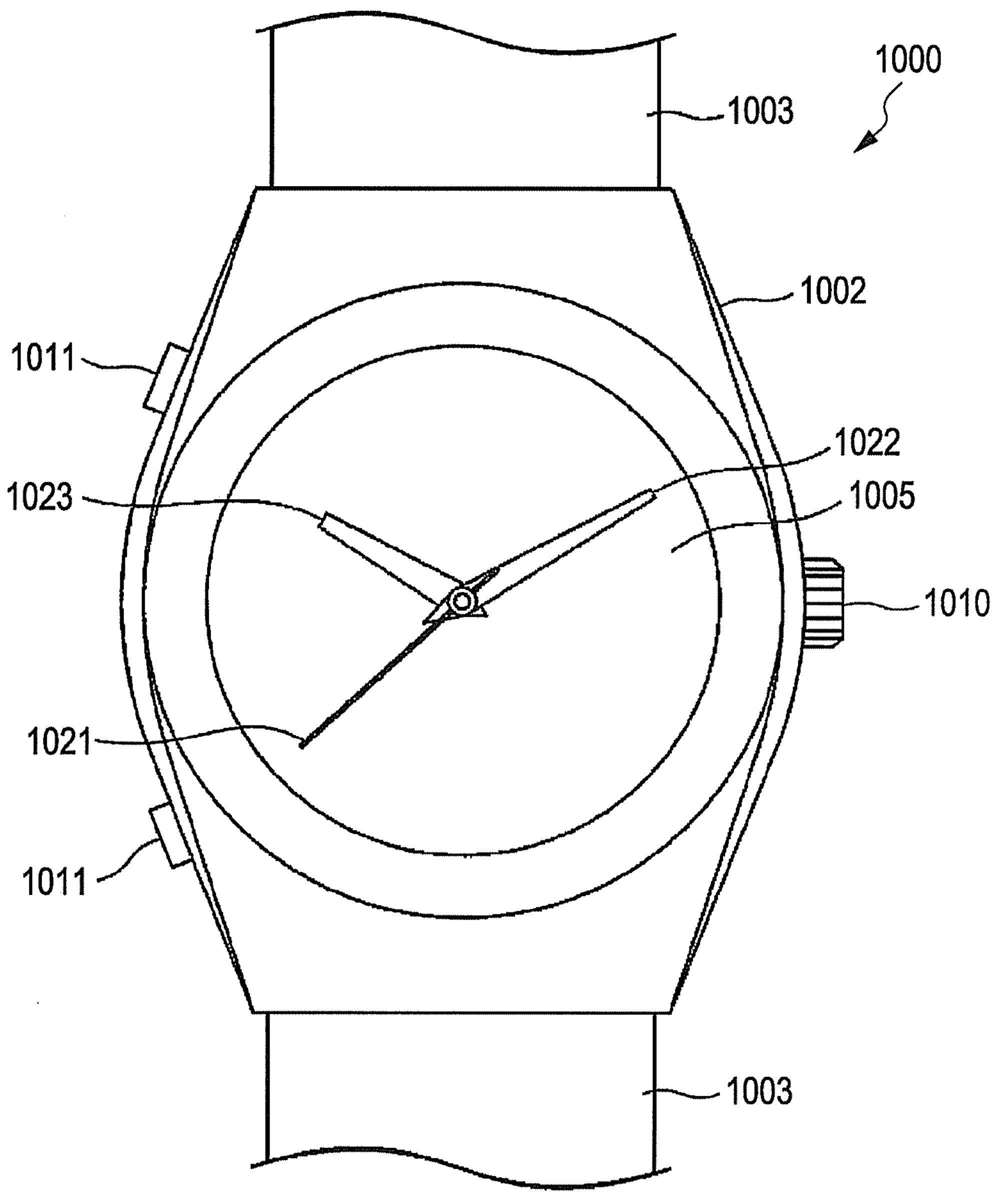
FIG. 14 is a drawing showing an example of an electronic device.

FIG. 14 is a front view showing a wrist watch 1000. The wrist watch 1000 includes a watch case 1002 and a pair of bands 1003 that are connected to the watch case 1002.

A display section 1005, a second hand 1021, a minute hand 1022 and an hour hand 1023 that consist of the electrophoretic display apparatus of the each of the embodiments are provided in the front side of the watch case 1002. A stem 1010 of the watch and operation buttons 1011 are provided in side surface of the watch case 1002. The stem 1010 is connected to a winding stem (not shown) that is provided in the interior of the case and is provided formed integrally with the winding stem so as to be able to be freely pushed and pulled in multi steps (for example, two steps) and to be able to be freely rotated. An image that becomes background, letter rows such as date and time, the second hand, the minute hand, the hour hand or the like can be displayed on the display section 1005.

Figure 15:
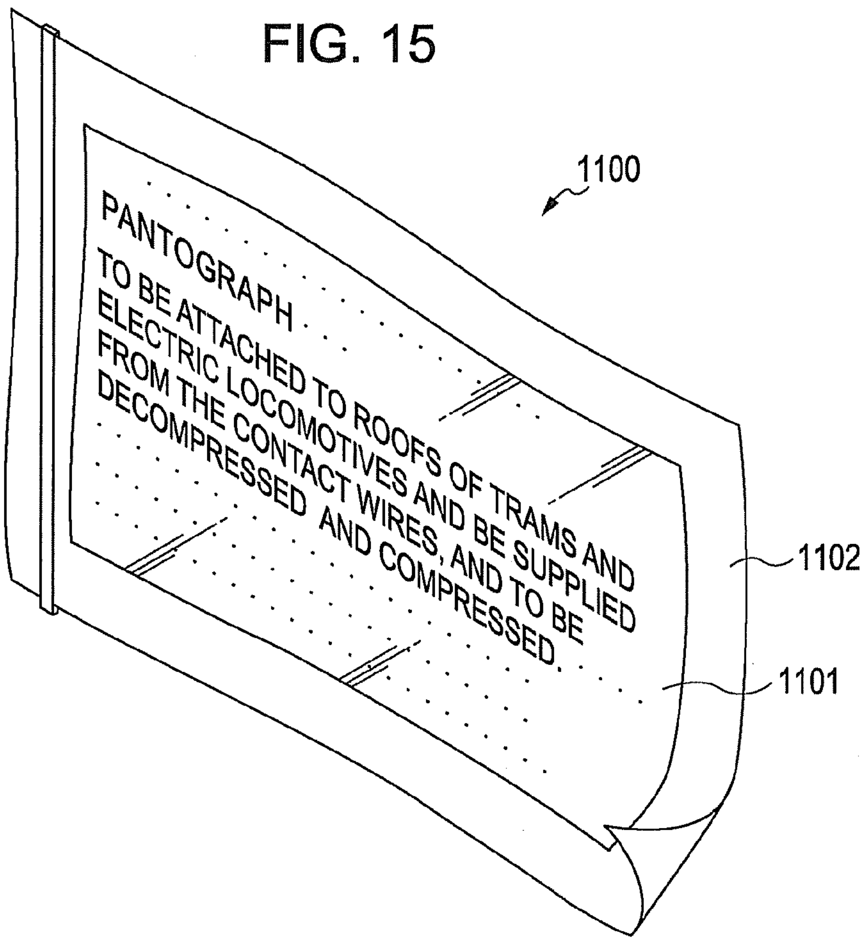
FIG. 15 is a drawing showing an example of an electronic device.

FIG. 15 is a perspective view showing a configuration of an electronic paper 1100. The electronic paper 1100 includes the electrophoretic display apparatus of the above-described embodiment at a display area 1101. The electronic paper 1100 is flexible and has a main body 1102 that consists of a rewritable sheet that has a texture and flexibility similar to the paper in related art.

Figure 16:
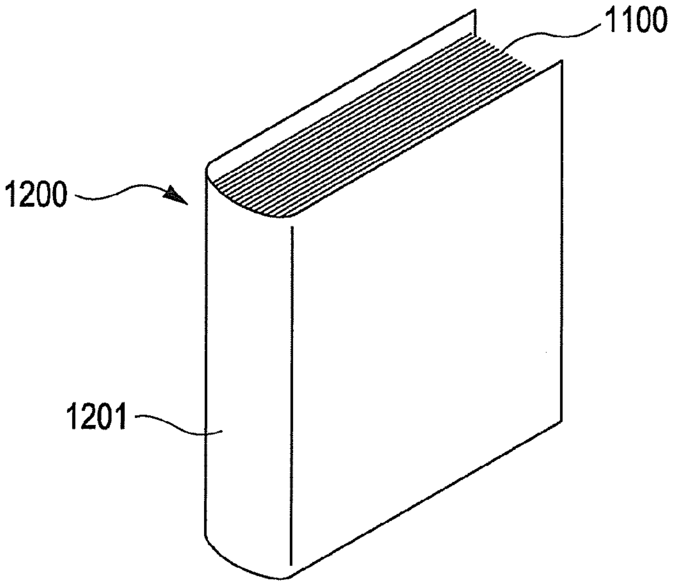
FIG. 16 is a drawing showing an example of an electronic device.

FIG. 16 is a perspective view showing a configuration of an electronic note 1200. The electronic note 1200 belongs a plurality of the electronic paper 1100 and is sandwiched with a cover 1201. The cover 1201 includes a display data input unit (not shown) that inputs the display data transported from exterior apparatus, for example. Thus, changing or updating of display contents can be performed even in the state where the electronic paper is belonged according to the display data.

According to the above-described wrist watch 1000, the electronic paper 1100 and the electronic note 1200, the electrophoretic display apparatus according to the invention is employed so that the electronic device includes the display unit that can display the high quality display without unevenness display.

The above-described electronic devices are examples of the electronic device according to the invention and the technical range of the invention is not limited to the examples. For example, the electric optical apparatus according to the invention can be preferably applied to the display section, electronic devices such as a cellular phone and a portable audio device.

What is claimed is:

1. An electric optical apparatus comprising a display section in which an electric optical material is provided between a pair of substrates and a plurality of pixels is arranged, and a control section, wherein the display section is provided with a first scanning line, a data line and a power-supply line that are connected to each of the plurality of pixels, each of the plurality of pixels is provided with a pixel electrode, a driving transistor that is directly connected between the pixel electrode and the power-supply line, a modulation capacitor that is connected between a gate of the driving transistor and the data line, a control transistor that is connected between the modulation capacitor and the data line, a maintenance capacitor in which one end is directly connected to the gate of the driving transistor, and a correction transistor having a gate and one terminal that are directly connected to the gate of the driving transistor, and when an image is displayed on the display section, the control section charges the maintenance capacitor, performs a threshold value voltage correction operation in which a portion of charges of the maintenance capacitor that is precharged is drawn out through the correction transistor so that a gate potential of the driving transistor is a threshold value voltage, inputs an image signal to the modulation capacitor through the control transistor, changes a potential of the power-supply line, and supplies current to the pixel electrode through the driving transistor.

2. The electric optical apparatus according to claim 1, further comprising a potential control line that is connected to the other terminal of the correction transistor.

3. The electric optical apparatus according to claim 1, further comprising a potential control line that is connected to the other end of the maintenance capacitor.

4. The electric optical apparatus according to claim 1, further comprising a precharge switching element in which an output terminal is connected to the gate of the driving transistor and the modulation capacitor.

5. The electric optical apparatus according to claim 4, further comprising a second scanning line different from the first scanning line to which each of the plurality of pixels is belonged is connected to an input terminal of the switching element for precharge.

6. The electric optical apparatus according to claim 4, further comprising a precharge power-supply line that is connected to the input terminal of the precharge switching element.

7. An electronic device comprising the electric optical apparatus according to claim 1.

8. A driving method of an electric optical apparatus comprising a display section in which an electric optical material is provided between a pair of substrates and a plurality of pixels is arranged, wherein the display section is provided with a scanning line, a data line and a power-supply line that are connected to each of the plurality of pixels, each of the plurality of pixels is provided with a pixel electrode, a driving transistor that is connected between the pixel electrode and the power-supply line, a modulation capacitor that is connected between a gate of the driving transistor and the data line, a maintenance capacitor in which one end is connected to the gate of the driving transistor, and a correction transistor having a gate and one terminal that are connected to the gate of the driving transistor, wherein displaying an image on the display section comprises:

precharging in which the maintenance capacitor is charged;

correcting a threshold value voltage in which a portion of a precharged potential that is precharged is drawn out through the correction transistor so that a gate potential of the driving transistor is the threshold value voltage;

programming in which an image signal is input to the modulation capacitor through the data line; and display driving in which a potential of the power-supply line is changed and a current is supplied to the pixel electrode through the driving transistor, wherein the electric optical apparatus further comprises a control transistor that is connected between the modulation capacitor and the data line, the image signal is input to the modulation capacitor through the control transistor in the programming, and a potential of the scanning line is input to the maintenance capacitor in the precharging.

9. The driving method of the electric optical apparatus according to claim 8, in the display driving, a ramp waveform is input to the power-supply line.

* * * * *